(12) United States Patent
Kuwabara et al.

(10) Patent No.: US 6,873,441 B1
(45) Date of Patent: Mar. 29, 2005

(54) IMAGE PROCESSING DEVICE FOR CORRECTING GRADATION OF COLOR IMAGE

(75) Inventors: Eishiro Kuwabara, Shijonawate (JP); Koji Nakamura, Itami (JP)

(73) Assignee: Kyocera Mita Corporation, Osaka-fu (JP)

( * ) Notice: Subject to any disclaimer, the term of this patent is extended or adjusted under 35 U.S.C. 154(b) by 880 days.

(21) Appl. No.: 09/665,212

(22) Filed: Sep. 18, 2000

(30) Foreign Application Priority Data

Sep. 20, 1999 (JP) .......................................... 11-265219

(51) Int. Cl.[7] .............................. H04N 1/56; H04N 1/58; G06T 5/00
(52) U.S. Cl. ...................... 358/3.26; 358/521; 358/522; 358/537; 382/162; 382/168; 382/275
(58) Field of Search ............................... 358/3.26, 522, 358/1.9, 463, 465, 448, 447, 453, 537, 538, 464; 382/162–163, 168, 275, 167, 176, 276, 170, 254, 164, 171, 165, 260

(56) References Cited

U.S. PATENT DOCUMENTS

| 5,646,744 A | * | 7/1997 | Knox | 358/401 |
|---|---|---|---|---|
| 5,689,590 A | * | 11/1997 | Shirasawa et al. | 382/162 |
| 5,768,412 A | * | 6/1998 | Mitsuyama et al. | 382/173 |
| 5,778,092 A | * | 7/1998 | MacLeod et al. | 382/176 |
| 5,832,137 A | * | 11/1998 | Knox | 382/275 |
| 5,956,468 A | * | 9/1999 | Ancin | 358/1.9 |
| 6,101,283 A | * | 8/2000 | Knox | 382/254 |
| 6,122,441 A | * | 9/2000 | Tsuji | 358/1.9 |
| 6,285,470 B1 | * | 9/2001 | Matsuda et al. | 358/474 |
| 6,288,798 B1 | * | 9/2001 | Sharma | 358/448 |
| 6,348,980 B1 | * | 2/2002 | Cullen et al. | 358/1.9 |
| 6,434,269 B1 | * | 8/2002 | Hamburg | 382/163 |
| 6,546,132 B1 | * | 4/2003 | Bhattacharjya et al. | 382/167 |
| 6,721,446 B1 | * | 4/2004 | Wilensky et al. | 382/162 |

FOREIGN PATENT DOCUMENTS

| JP | 01196975 | 8/1989 | ............ H04N/1/46 |
|---|---|---|---|
| JP | 03044268 | 2/1991 | ............ H04N/1/40 |
| JP | 06014185 | 1/1994 | ............ H04N/7/40 |
| JP | 07303188 | 11/1995 | .......... H04N/1/407 |
| JP | 09051443 | 2/1997 | ............ H04N/1/60 |
| JP | 10093835 | 4/1998 | ............ H04N/1/60 |
| JP | 10164368 | 6/1998 | .......... H04N/1/407 |

* cited by examiner

Primary Examiner—Scott A. Rogers
(74) Attorney, Agent, or Firm—Jordan and Hamburg LLP

(57) ABSTRACT

This invention provides an image processing device in which a pixel satisfying a certain unwanted gradation condition with respect to all the plurality of color components is judged as a unwanted pixel derived from unnecessary image data, and each of gradation data of the plurality of color components composing the unwanted pixel is converted into a certain background gradation which is predetermined with respect to each one of the color components. The image processing device eliminates a possibility that a pixel satisfying the unwanted gradation condition with respect to part of the color components is judged as the unwanted pixel. This arrangement enables to securely extract and remove the unwanted pixel attributed to the unnecessary image data such as undertone and backside image data and prevents degraded image reproduction due to color change resulting from erroneous removal of part of the color components of the necessary image data.

29 Claims, 15 Drawing Sheets

Cyan

Magenta

Yellow

Cyan

Magenta

Yellow

Cyan

Magenta

Yellow

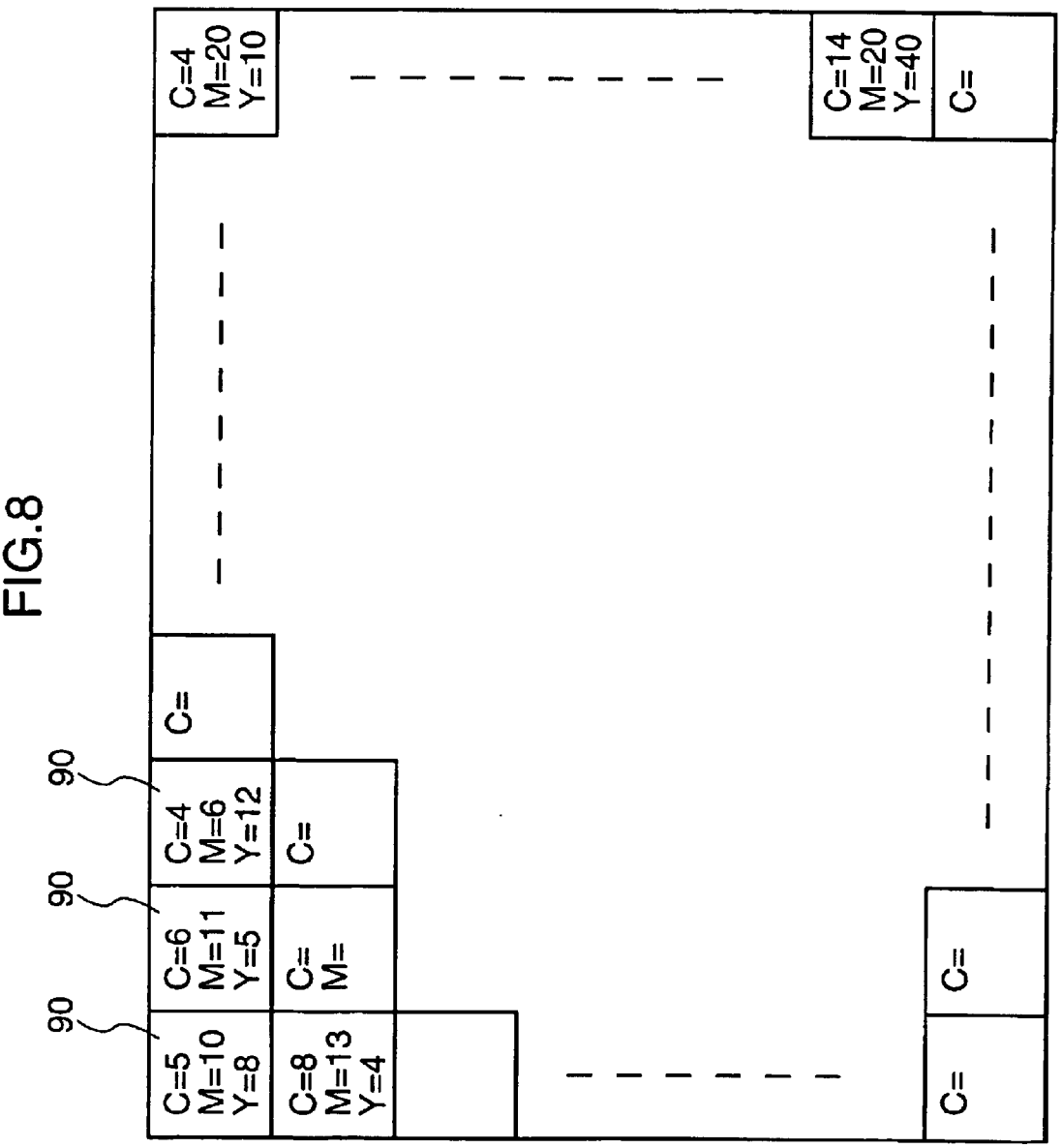

UNWANTED PIXEL

GRADATION DIFFERENCE

ADJUSTING PIXEL

IMAGE PROCESSING DEVICE FOR CORRECTING GRADATION OF COLOR IMAGE

BACKGROUND OF THE INVENTION

1. Field of the Invention

This invention relates to an image processing device for correcting gradation data of color input image data that has been obtained by reading a document image with use of a copier, facsimile machine, scanner or the like.

2. Description of the Related Art

There sometimes rises a problem that image data obtained by reading a document image by a copier or the like may contain unnecessary image data that is undesired to be reproduced such as undertone and backside image. Particularly, in the case of reading a document image formed on color paper or a document image formed on both sides of extremely thin paper, data concerning the undertone or the backside image may likely to be included in the read image data.

Unnecessary image data such as undertone data generally consists of lower gradation components. Monochromatic copiers that have been used heretofore enable to remove such an unnecessary image data by setting a certain gradation as an uppermost gradation of the unnecessary image data (e.g., undertone data) and cutting off gradation components lower than the uppermost gradation.

As far as monochromatic image reading is concerned, it is possible to reproduce an image with a continuous gradation by taking the following measures. Specifically, as a further step of the above image processing, after removing the lower gradation components, the gradation range of the remaining part of the input image data including medium and higher gradation components is redefined as a new effective gradation range (for example, ranging from 0 to 255 gradations), thus producing new lower gradation components. This arrangement makes it possible to prevent forming a conspicuous gradation difference (step) around a boundary region between the unnecessary image data to be removed and the remaining part of the input image data.

In the case of color copiers that have been recently popular in the market, however, the above measures is not effective for the following reason when image processing is attempted to remove unnecessary image data such as undertone data from a scanned original color image data.

A color image is composed by mixing a plurality of different color components such as red (R), green (G), and blue (B) or cyan (C), magenta (M), and yellow (Y). Although mixing all the color components may produce a color different from undertone, there sometimes is a case that a certain image region of an original color image coincidentally contains a color component identical to a color component of the undertone.

Let's say that the certain image region contains a specific color component (for instance, yellow color component) which is identical to the undertone generally in a lower gradation range. For example, there is a case that an original document is tanned and accordingly the undertone thereof contains a yellow color component, and the original document image contains gradation data of a yellow color component of skin color of a human, which is coincidentally the same as the yellow color component of the undertone.

In such a case, removing all the lower gradation components corresponding to the undertone may altogether remove the lower gradation components that are not originated from the undertone data. Consequently, a reproduced color image does not contain the lower gradation components that have constituted part of the original color image any more, and accordingly, the reproduced color image may look different from the original color image, thus degrading color image reproducibility.

Further, since the gradation of the undertone generally differs color component by component, the uppermost gradation thereof to be cut off differs from color component to component. Accordingly, in image processing of a color image composed of different color components, it is considered to implement a gradation redefining process with respect to each of the color components in which the remaining gradation range (uncut portion) for each color component is magnified to fit to the available gradation range at a different gradation magnification rate with an attempt to suppress a gradation difference in the boundary region. However, this gradation redefining process may cause an unbalanced distribution of color components, thereby resulting in poor color image reproduction.

SUMMARY OF THE INVENTION

In view of the above problems residing in the prior art, it is an object of the present invention to provide an image processing device that enables to remove an unnecessary image data from color input image data while suppressing degraded color image reproduction.

To accomplish the above object, the image processing device according to this invention judges that a pixel satisfying a certain unwanted gradation condition (or referred also as a certain removing gradation condition) with respect to all the color components is a unwanted pixel attributed to the unnecessary image data and hence to be removed, and each of the gradation data of the plurality of color components composing the unwanted pixel is converted into a certain background gradation which is predetermined with respect to each of the color components.

In the above arrangement, there is no possibility that the pixel that has satisfied the unwanted gradation condition with respect to part of the color components is judged as the pixel to be removed. This arrangement enables to securely extract and remove the unwanted pixel attributed to the unnecessary image data such as undertone and backside image data without unwanted part of the color components constituting the necessary image data, and enables to prevent poor color image reproduction accompanied by undesirable color change.

These and other objects, features and advantages of the present invention will become more apparent upon a reading of the following detailed description and accompanying drawings.

BRIEF DESCRIPTION OF THE DRAWINGS

FIG. 8 is an explanatory diagram illustrating a color image data composed of a plurality of pixel data.

DETAILED DESCRIPTION OF THE PREFERRED EMBODIMENTS

A color copying machine incorporating an image processing device embodying the present invention is described with reference to the accompanying drawings.

Figure 1:
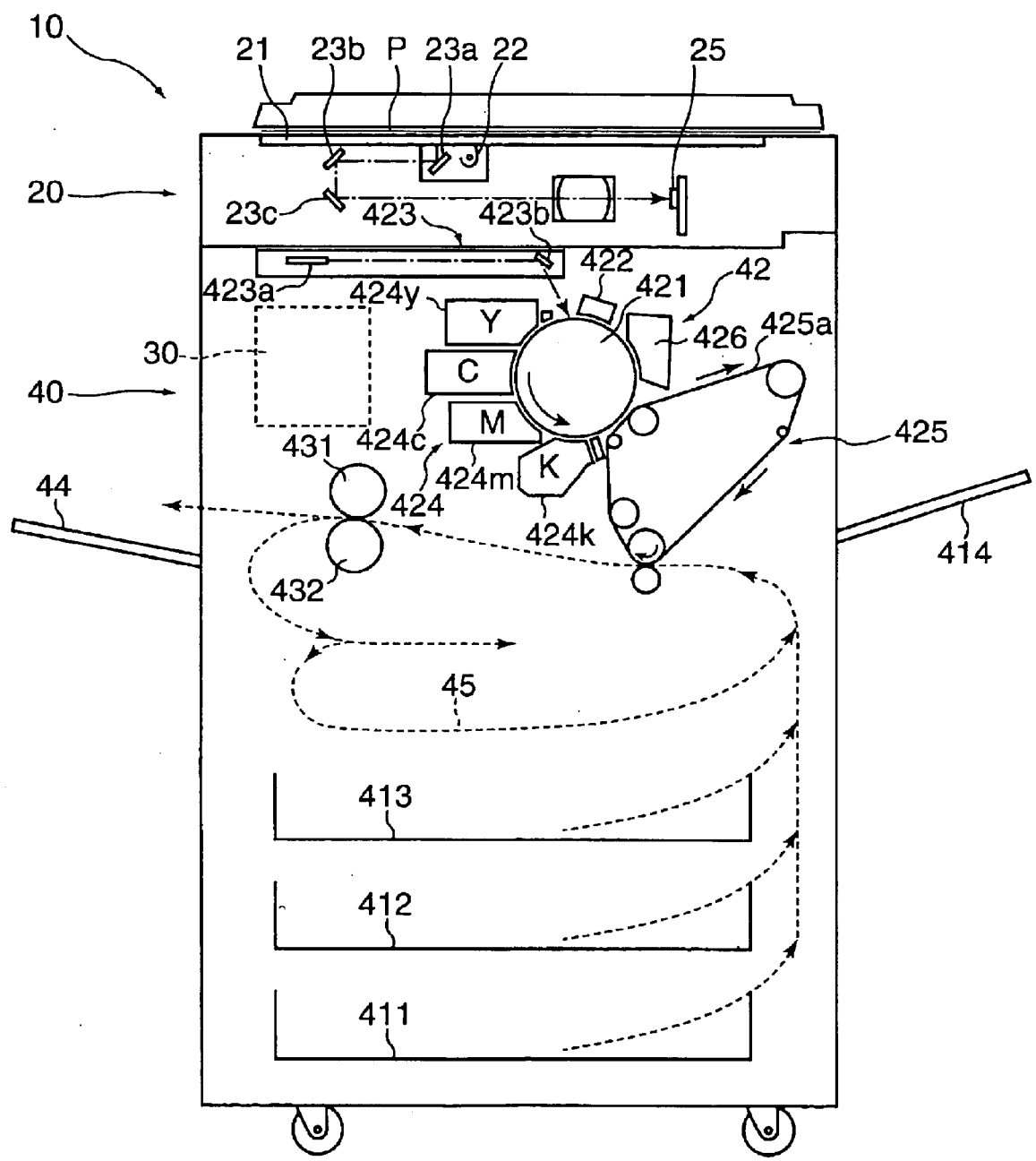
FIG. 1 is a schematic diagram showing an entire construction of a color copying machine incorporating an image processing device embodying the present invention.

FIG. 1 is a schematic diagram of a color copying machine incorporating the image processing device. The color copying machine 10 comprises an image reading section 20 for reading an original image of a color document P placed on a contact glass, an image processing section (image processing device) 30 for implementing a specified image processing to the color document image read by the image reading section 20 as input image data, and an image forming section 40 for forming an image on recording paper based on the image data processed by the image processing section 30.

The image reading section 20 is generally constructed as follows. Light from an exposure lamp 22 is irradiated onto the surface of the document P placed on a contact glass 21. The light reflected from the document surface is received by a photoelectric conversion element 25 such as a CCD by way of reflective mirrors 23a, 23b, and 23c, and color separation filters of red (R), green (G), and blue (B) to separate the color image data of the document P into three color components of red (R), green (G), and blue (B) so as to read color image data of R, G, B in proportion to light intensities of the respective color components. The read color image data of R, G, B are respectively analog-to-digital converted into digital values to be inputted to the image processing section 30 as input image data.

The image processing section 30 comprises a computer circuitry including a computation section, a memory, and the like, which are not shown in FIG. 1. The input image data read by the image reading section 20 is subjected to a certain image processing to produce corrected input image data depending on a developing characteristic of the image forming section 40. The arrangement and image processing procedures of the image processing section 30 are described later.

The image forming section 40 is generally constructed as follows. An image transfer unit 42 is adapted to transfer a toner image on recording paper fed from one of sheet cassettes 411, 412, 413 all of which are disposed in a lower part of the copying machine 10 or from a manual tray 414 based on output image data. The recording paper is discharged onto a discharge tray 44 after having the toner image fixed by a heater roller 431 and a presser roller 432. Numeral 45 is a sheet inverting unit for turning the recording paper for double-sided image formation to transport the recording paper after one-sided image formation to the image transfer unit 42 again.

The image transfer unit 42 has a photo-conductive photosensitive drum 421 rotatably supported about its own axis. The image transfer unit 42 further comprises a charger 422, an exposure unit 423, a developing unit 424, a transfer device 425, and a cleaner 426 around the photosensitive drum 421 from upstream in this order with respect to the rotating direction thereof. The charger 422 supplies a certain potential to the surface of the photosensitive drum 421 by corona discharge from a charging wire (not shown) when a high voltage is applied thereto. The exposure unit 423 selectively attenuates the surface potential of the photosensitive drum 421 by irradiating a laser beam of a certain light intensity from a laser emitter 423a by way of a mirror 423b in correspondence with output image data to form an electrostatic latent image onto the surface of the photosensitive drum 421. The developing unit 424 develops the latent image into a toner image by supply of toner particles. The transfer device 425 transfers the toner image formed on the photosensitive drum surface onto recording paper. The cleaner 426 removes residue charges and residue toner particles from the surface of the photosensitive drum 421.

In the color coping machine 10 for forming a color copy image, the exposure unit 423 is adapted to form a latent image with respect to each of the color components of output image data, and the developing unit 424 further comprises four color developers 424c, 424m. 424y, and 424k respectively adapted for developing toner images of cyan (C), magenta (M), yellow (Y), and black (K). The transfer device 425 temporarily transfers toner images of the respective colors which have been developed on the photosensitive drum surface onto a transfer belt 425a (first-step transfer), and then transfers the temporarily transferred toner images onto recording paper that is being conveyed over the transfer belt 425a in a superposing manner (second-step transfer).

Figure 2:
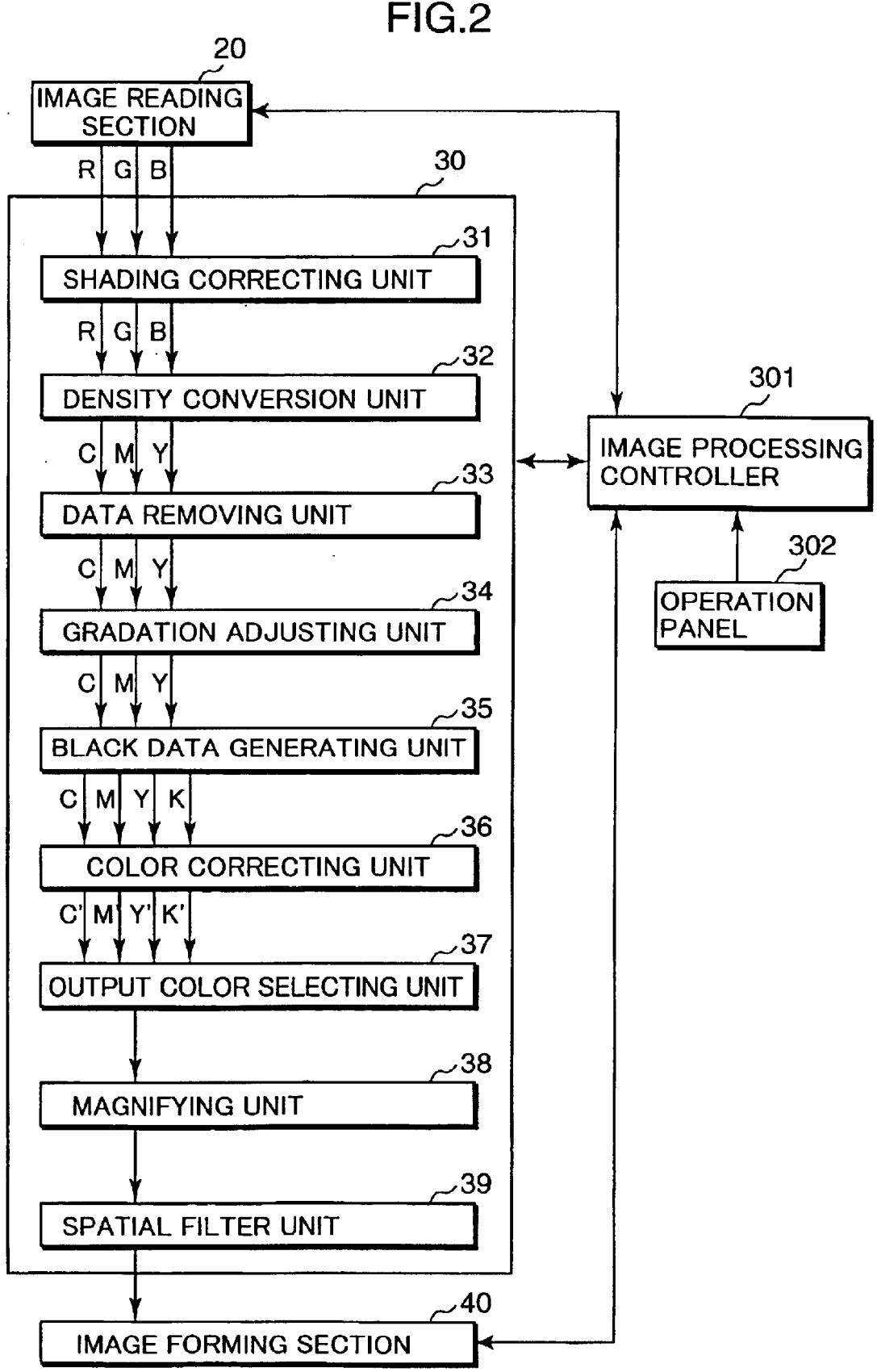
FIG. 2 is a diagram showing a general arrangement of the image processing device.

Next, the overall construction of the image processing section 30 is described with reference to FIG. 2.

The image processing section 30 in the embodiment comprises, in addition to an image processing controller 301 and an operation panel 302, a shading correcting unit 31, a density conversion unit 32, an unnecessary image data removing unit 33 (hereinafter, simply referred to as data removing unit 33), a gradation adjusting unit 34 for adjusting gradation of an adjusting image area which is described later, a black data generating unit 35, a color correcting unit 36, an output color selecting unit 37, a magnifying unit 38, and a spatial filter unit 39.

The image processing controller 301 controls an overall operation of the copying machine 10 including the image processing section 30, the image reading section 20, and the image forming section 40 (image output section). The operation panel 302 is adapted to receive an operation signal from a user. The operation panel 302 is provided with various keys including a start key and a copy number designation key, and is adapted to receive various operation signals including a signal indicating mode selection which is operable in the process of unnecessary image data removal. The mode selection is described later in detail.

The shading correcting unit 31 compensates for exposure distribution characteristic of the exposure lamp 22 and light sensitivity distribution characteristic of the photoelectric conversion element 25 in the image reading section 20 with respect to input image data of R, G, and B that have been read by the image reading section 20.

The density conversion unit 32 converts input image data which are signals corresponding to light intensities of R, G, B, into signals (density recording signals) corresponding to C, M, Y, respectively.

The data removing unit 33 and the gradation adjusting unit 34 are adapted to implement a certain image processing which is the primary feature of this invention. These units 33 and 34 are described in detail in the following section with reference to FIG. 3 and the other drawings when need arises to do so.

The black data generating unit 35 generates image data of black color K by using image data of C, M, Y.

The color correcting unit 36 converts color image data of C, M, Y, K into respective color data of C', M', Y', K' in order to offset a difference between theoretical colors of respective color toners provided in the image forming section 40 and what is expected to be reproduced on recording paper, taking into account the developing characteristic of the image forming section 40.

The output color selecting unit 37 selects a next color to be developed in view of the fact that the image forming section 40 executes development color by color.

The magnifying unit 38 enlarges or reduces the image to be processed in accordance with a designated magnification ratio.

The spatial filter unit 39 executes an outline highlighting process when the image data to be processed is a character or a text data, and executes a smoothing process when the image data to be processed is a photographic image data or a half-tone image data.

Next, the data removing unit 33 and the gradation adjusting unit 34 which are the primary elements of this invention are described.

Figure 3:
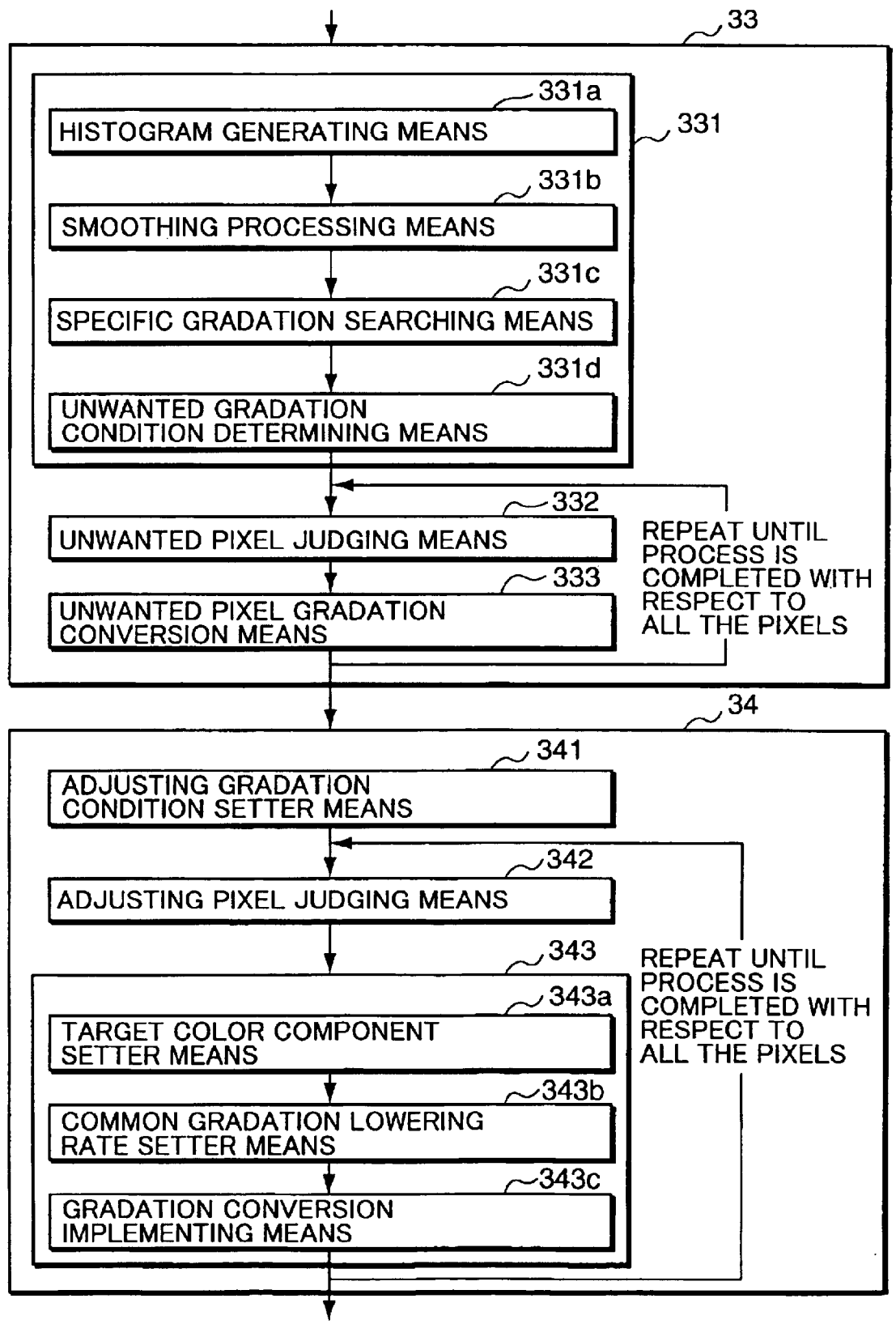
FIG. 3 is a diagram showing a detailed arrangement of an unnecessary image data removing unit and a gradation adjusting unit which are incorporated in the image processing device.

The data removing unit 33 removes unnecessary image data such as an undertone and a backside image which may be included in the input image data to be processed. As shown in FIG. 3, the data removing unit 33 is roughly divided into the following three elements:

(A-1) a unwanted gradation condition setter means 331 for determining a gradation range of the unnecessary image data in the input image data to set a unwanted gradation condition (requirement) which is adapted to extract a pixel attributed to the unnecessary image data;

(A-2) a unwanted pixel judging means 332 for judging whether a pixel composing the input image data is the unwanted pixel which satisfies the aforementioned unwanted gradation condition; and (A-3) a unwanted pixel gradation conversion means 333 for converting the gradation of the unwanted pixel in order to remove the unwanted pixel.

The gradation adjusting unit 34 implements the following process. Specifically, accompanied by dropping out a certain gradation range attributed to the unnecessary image data, it is highly likely that a gradation difference (step) occurs in a boundary region between the removed image data and the remaining part of the input image data, thereby resulting in degraded image reproduction such as generation of a pseudo outline and a partial non-image formed area. The gradation adjusting unit 34 is adapted to prevent such a degraded image reproduction.

The gradation adjusting unit 34 sets a pixel having a gradation closer to the gradation range of the unnecessary image data as an adjusting pixel and implements a certain gradation conversion to the adjusting pixel so as to suppress the above-mentioned gradation difference.

More specifically, the gradation adjusting unit 34 is roughly divided into the following three elements:

(B-1) an adjusting gradation condition setter means 341 for setting an adjusting gradation condition (requirement) which is adapted to extract a pixel attributed to the adjusting image area;

(B-2) an adjusting pixel judging means 342 for judging whether the pixel that has not been judged as the unwanted pixel is the adjusting pixel which satisfies the aforementioned adjusting gradation condition; and (B-3) an adjusting pixel gradation conversion means 343 for converting the gradation of the adjusting pixel.

Hereinafter, what is implemented by these elements is described one by one.

(A-1) Unwanted Gradation Condition Setter Means

The unwanted gradation condition setter means 331 is further divided into the following four sub-elements:

(A-1-1) a histogram generating means 331a;

(A-1-2) a smoothing processing means 331b;

(A-1-3) a specific gradation searching means 331c; and (A-1-4) a unwanted gradation condition determining means 331d.

(A-1-1) Histogram Generating Means

The histogram generating means 331a generates three histograms in each of which the number of pixels having a certain gradation value is indicated in terms of frequency with respect to cyan, magenta, and yellow, respectively, based on gradation data of input image that has been stored in a memory or obtained by pre-scanning. The thus produced histogram is used to set an appropriate unwanted gradation condition based on the input image data in accordance with the below-mentioned processes. Since the unwanted gradation condition for removing an unnecessary image data in the input image data is set based on each of the gradation data of the plurality of color components of the input image data, an accurate unwanted gradation condition can be set.

FIG. 8 schematically shows an example of a certain input image data. Each of pixels 90 has gradation values with respect to C, M, Y. The histogram generating means 331a, for instance, generates a histogram of cyan (C) by counting up the number of pixels with respect to each of the gradation values of cyan (C) throughout all the pixels 90, then, generates a histogram of magenta (M) by counting up the number of pixels with respect to each of the gradation values of magenta (M) throughout all the pixels 90, and finally generates a histogram of yellow (Y) by counting up the number of pixels with respect to each of the gradation values of yellow (Y) throughout all the pixels 90.

Figure 4A:
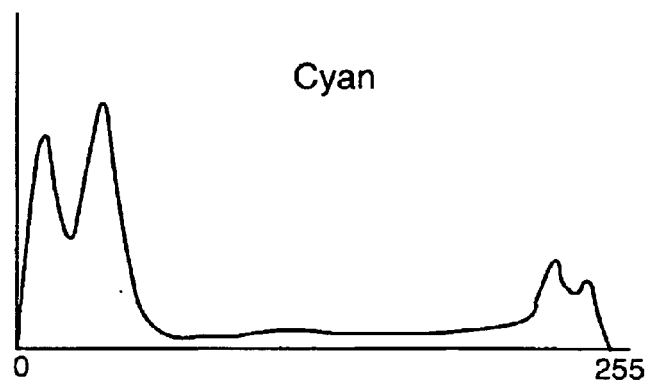
FIGS. 4A to 4C are examples of histograms showing gradation distributions of input image data of cyan, magenta, and yellow, respectively.
Figure 4B:
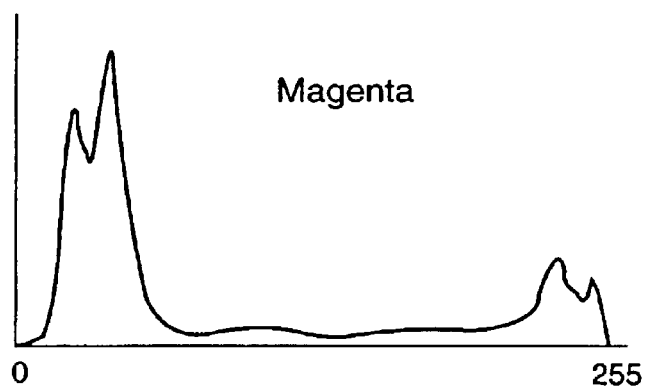
Figure 4C:
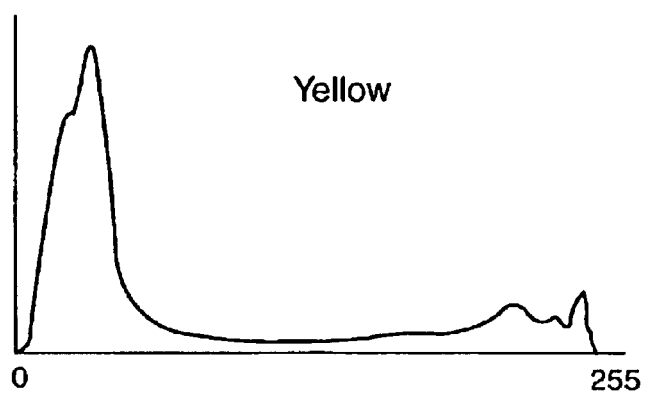

FIGS. 4A, 4B, and 4C are examples of three histograms generated by the histogram generating means 331a based on a certain input image data.

For sake of easy explanation, the histograms show illustrative specific curves. Since the histogram generating means 331a is provided in a computer circuitry, the frequency of each gradation value may be represented in terms of electronic data with respect to each color component.

Generally, the unnecessary image data such as undertone and backside image data included in the input image data exhibits a characteristic such that a large peak appears in a lower gradation range in the respective histograms of cyan, magenta, and yellow. Accordingly, detecting an uppermost gradation value or a lowermost gradation value of such a characteristic portion (for example, a peak having the highest peak point) which is presumed to be derived from the unnecessary image data enables to determine a gradation range of the unnecessary image data with respect to each of the color components.

Figure 9A:
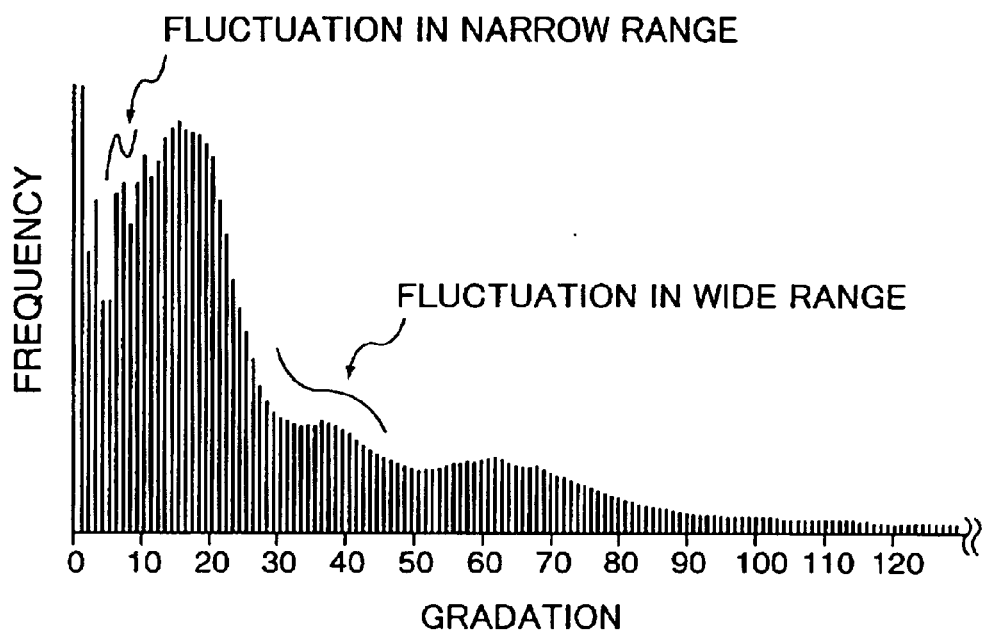
FIG. 9A is a diagram illustrating an example of a histogram before implementing the smoothing process.

However, in light of the fact that a frequency of a gradation in an area lower than the gradation range of the unnecessary image data is generally small, a noise component may likely to be intruded in this lower gradation area, thereby undesirably generating a small range fluctuation (an up and down within a small gradation range indicated by the arrow in FIG. 9A) in the curve of the histogram. The occurrence of such a fluctuation obstructs accurate detection of the gradation range of the unnecessary image data.

(A-1-2) Smoothing Processing Means

The smoothing processing means 331b executes a smoothing process to eliminate the above-mentioned small fluctuation with respect to the histograms of the color components of C, M, Y in order to eliminate the noise component. The smoothing process is effected by implementing a computation by an average value filter represented by the following equation (1):

$$h'(i)=\{h(i-1)+h(i)+h(i+1)\}/3 \qquad (1)$$

where i is a natural number and a gradation value being changed stepwise, h(i) is a frequency of the gradation value i, and h'(i) is a frequency after smoothing.

The smoothing process in accordance with equation (1) is preferably repeated for a certain number of times (for example, three times) to securely eliminate the fluctuation that should not be detected.

Figure 9B:
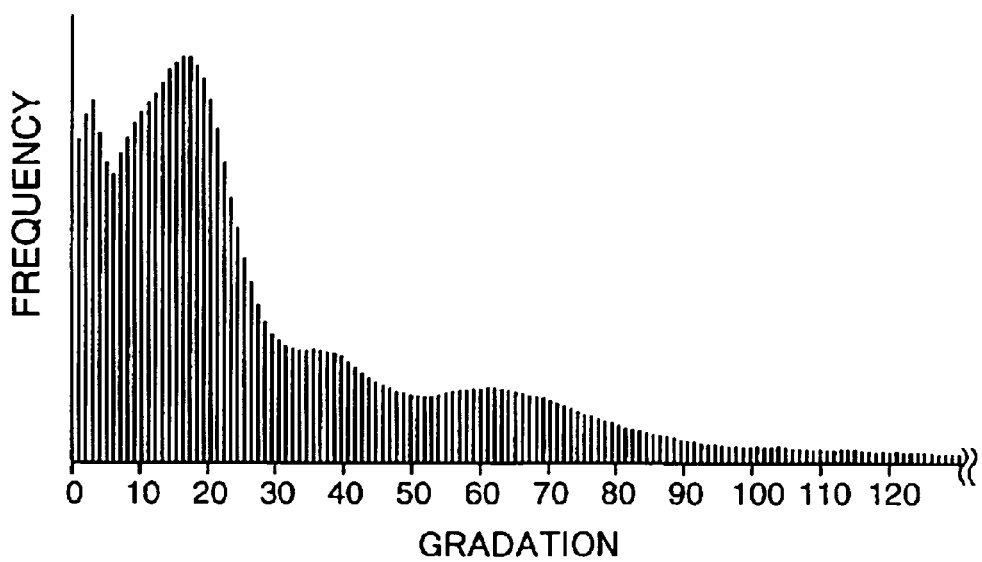
FIG. 9B is a diagram illustrating an example of a histogram after implementing the smoothing process.

FIGS. 9A and 9B are diagrams describing smoothing process. FIG. 9A is an example of a histogram before smoothing process, and FIG. 9B is an example of a histogram after smoothing process. As shown in FIG. 9A, since the histogram produced from the input image includes a number of small fluctuations before implementing smoothing process, it is likely that accurate detection of a peak that is presumed to be derived from unnecessary image data may be obstructed. However, implementing the smoothing process, as shown in FIG. 9B, in which smaller fluctuations are trimmed off while retaining the largest peak presumably derived from the unnecessary image data enables to more accurately detect the gradation range of the unnecessary image data.

Figure 5A:
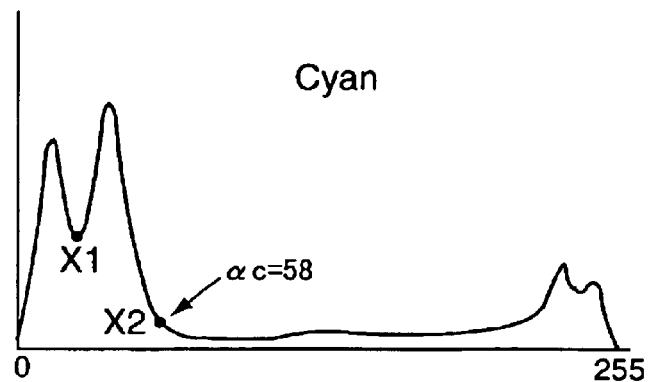
FIGS. 5A to 5C are examples of histograms after implementing a smoothing process with respect to the histograms of FIGS. 4A to 4C, respectively.
Figure 5B:
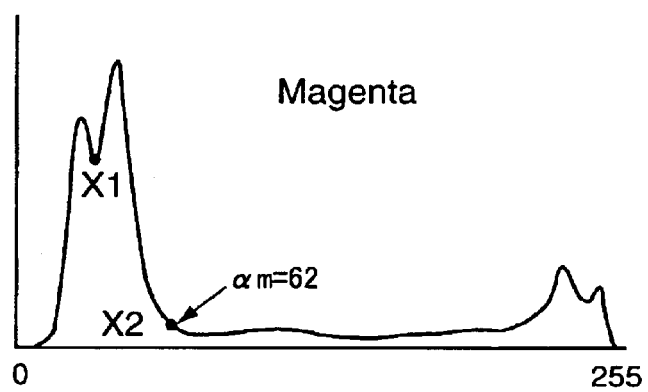
Figure 5C:
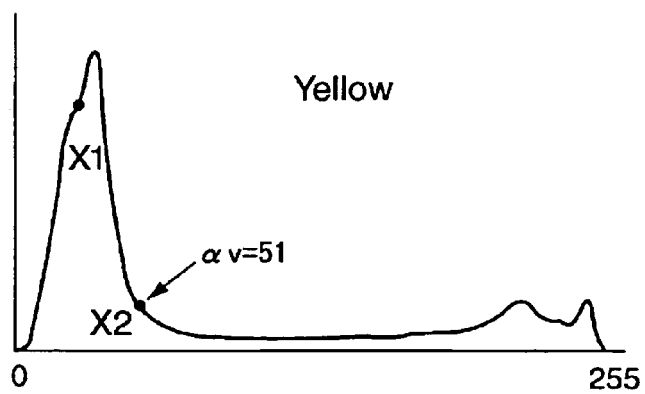

FIGS. 5A, 5B, 5C are examples of respective histograms corresponding to the histograms of FIGS. 4A, 4B, 4C after the smoothing process, i.e., after implementing the computation in accordance with equation (1) for three times.

(A-1-3) Specific Gradation Searching Means

Figure 10:
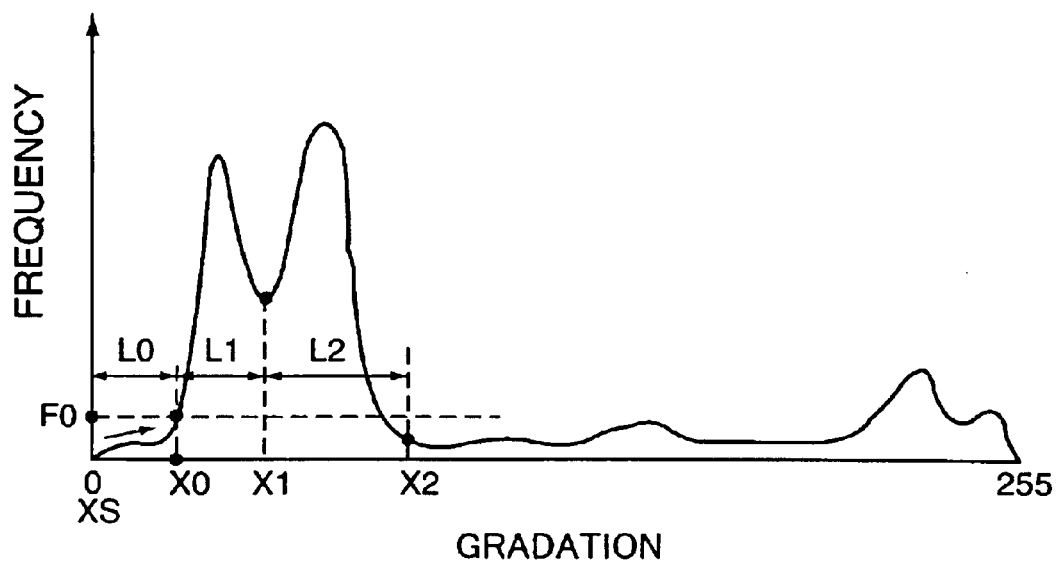
FIG. 10 is an explanatory diagram indicative of how to search for a target gradation.
Figure 11:
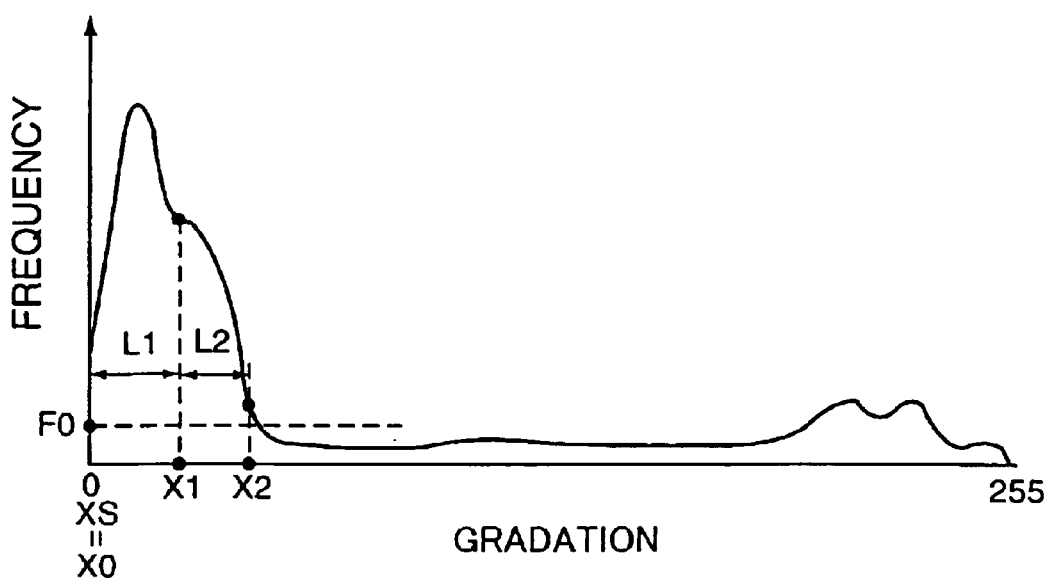
FIG. 11 is an altered explanatory diagram indicative of how to search for a target gradation.
Figure 12:
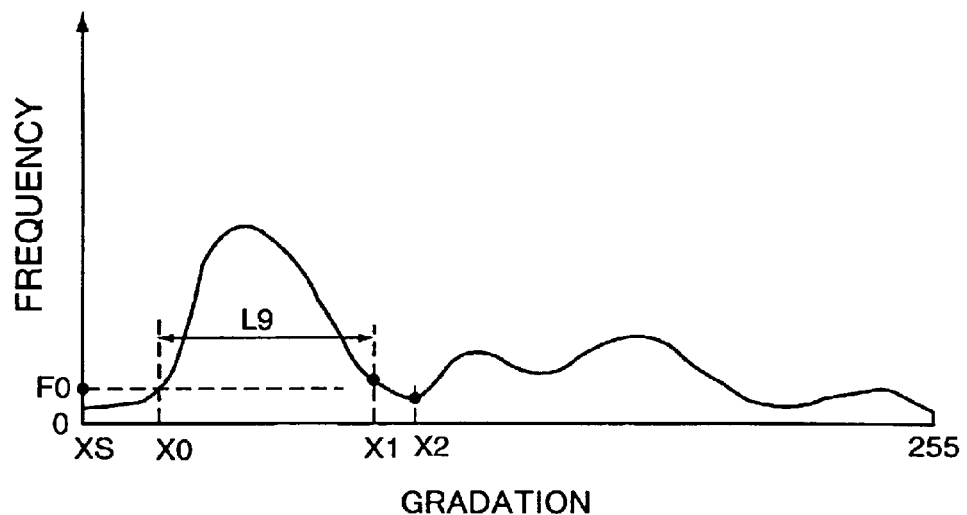
FIG. 12 is a further altered explanatory diagram indicative of how to search for a target gradation.

The specific gradation searching means 331c searches for a specific gradation with respect to each of the color components of C, M, Y based on the histograms. The specific gradation to be searched includes an uppermost gradation and a lowermost gradation of the unnecessary image data. FIGS. 10, 11 and 12 are explanatory diagrams indicative of how to search for the specific gradation.

As shown in these drawings, first, the frequency of each gradation is checked from the lowest gradation XS (gradation value of 0) toward a higher gradation to detect a lowermost gradation having a frequency greater than a predetermined frequency F0 so as to set the lowermost gradation as a detection start gradation X0 (see FIG. 10). Setting a smallest frequency that is presumably judged to belong to the peak as the predetermined frequency F0 enables to define the detection start gradation X0 as the lowermost gradation of the gradation range of the unnecessary image data.

Searching for the gradation from the detection start gradation X0 prevents a possibility that a noise component in a lower gradation area L0 lower than the gradation ranges L1, L2 which are supposed to be of the unnecessary image data be erroneously detected. Thus, the gradation ranges L1, L2 of the unnecessary image data can be securely detected.

As shown in FIG. 11, in the case where the gradation range L1 of the unnecessary image data includes the lowest gradation (gradation value of 0), the lowest gradation XS (gradation value of 0) is set as the detection start gradation X0.

Thus determining the detection start gradation X0 enables to carry on searching toward a higher gradation stepwise so as to detect a target gradation that satisfies one of the following four requirements or conditions (I) to (IV) as a specific gradation X1, X2, . . . and so on:

(I) under this condition, gradation at which the slope of the curve in the histogram shifts from negative to positive is the specific gradation;

(II) under this condition, gradation at which a change rate of the slope of the curve in the histogram shifts from negative to positive is the specific gradation;

(III) under this condition, gradation at which the slope of the curve in the histogram is negative, and a ratio of the frequency of the gradation to a sum of the frequencies of the gradations lower than the gradation including the gradation is or smaller than a predetermined value is the specific gradation;

(IV) under this condition, gradation at which a distance (width) from the detection start gradation toward a higher gradation is or greater than a predetermined value is the specific gradation. This condition is applied exclusively to a first detected gradation.

Condition (I) is adapted to detect a valley between two large peaks in the histogram. Generally, unnecessary image data, namely, data concerning undertone and backside image form large peaks respectively in the histogram. Accordingly, condition (I) makes it possible to detect an uppermost gradation or a lowermost gradation of the gradation range of the unnecessary image data. Gradation X1 in FIG. 10 is the specific gradation that has been detected by satisfying condition (I).

Condition (II) is adapted to detect a specific portion of the curve where change of the frequency is great in the histogram. A certain area of a document may contain a plurality of kinds of unnecessary image data, for example, undertone and backside image in an overlapped state. In such a case, these different kinds of unnecessary image data are detected as different peaks in a proximate or superposing manner, thereby obstructing formation of a clear valley as detectable by condition(I). Even in such a case, however, by taking the advantage of the fact that the curve of the histogram in the superposing portion changes in such a manner that the slope of the curve shifts from negative to positive or vice versa, condition (II) enables to detect the gradation that separates these two peaks. Gradations X1, X2 in FIG. 11 are the respective specific gradations that have been detected by satisfying condition (II).

Condition (III) is adapted to detect a higher-gradation-side terminal point of the peak in the histogram. The peak supposed to be derived from the unnecessary image data in the histogram has a characteristic such that the frequency gradually lowers after passing the peak toward the higher gradation side with the result that there is a difficulty in detecting a terminal point of the peak by conditions (I) or (II). Note that, however, there is a characteristic that a ratio of the frequency of the gradation at the lower-side and higher-side terminal points of the gradation distribution of the unnecessary image data to the sum of the frequencies of the gradations of the unnecessary image data is significantly small. Taking into account this fact, a gradation at which a ratio of the frequency of the gradation to the sum of the frequencies of the gradations lower than the gradation and including the gradation is equal to or lower than a predetermined value can be judged as an uppermost gradation of the gradation distribution of the unnecessary image data.

Namely, condition (III) is adapted to detect a gradation in which a ratio of the frequency of the checked gradation to the sum of the frequencies of the lower-gradation-side including the checked gradation is or smaller than a predetermined value, as a specific gradation representing the higher-gradation-side terminal point of the peak that is supposed to be derived from the unnecessary image data. Gradation X2 in FIG. 10 is the specific gradation that has been detected by satisfying condition (III).

Condition (IV) is adapted to prevent an erroneous detection in which an exceedingly high gradation is detected as a specific gradation in the case where none of the conditions (I), (II), (III) is applicable to detect the gradation for identifying the unnecessary image data in the histogram. Condition (IV) is applicable only to a first detected gradation when searching for the target gradation from the detection start gradation X0 toward higher gradation side by using the frequency of each gradation as a parameter. Condition (IV) enables to set the detection start gradation X0 as a lowermost gradation of the unnecessary image data and automatically pick up a gradation higher than the detection start gradation X0 by a certain gradation width L9 step by step by taking advantage of the fact that the gradation distribution of the unnecessary image data has a certain gradation range. Gradation X1 in FIG. 12 is the specific gradation that has been detected by satisfying condition (IV).

In this way, by utilizing various conditions (I) to (IV) according to needs, the gradation range of the unnecessary image data can be securely searched to cope with a variety of kinds of input image data.

Note that the specific gradation search by the specific gradation searching means 331c can be implemented stepwise from the lowest gradation (gradation value of 0) to the highest gradation (gradation value of 255 in the case where each of the color components has 256 gradations), or from the lowest gradation up to a predetermined gradation (for example, gradation value of 100), or by picking up a certain number of (for instance, two) specific gradations such as gradations X1, X2, . . . which are away from each other by a certain gradation width. In any case, terminating a specific gradation search upon detecting a predetermined required number of specific gradations X1, X2, . . . depending on the kind of removing process mode is preferable to shorten a search time. The removing process mode is described later.

(A-1-4) Unwanted Gradation Condition Determining Means

The unwanted gradation condition determining means 331d sets the gradation range of the unnecessary image data based on the specific gradations X1, X2, . . . which have been obtained by the specific gradation searching means 331c so as to determine a unwanted gradation condition based on the set gradation range of the unnecessary image data.

As mentioned above, the unnecessary image data includes various data concerning undertone and backside image of a document, and what kind of unnecessary image data is included in the input image data differs from document to document. Accordingly, it is required to cope with any kind of unnecessary image data that is presumed to be included in the input image data when setting the gradation range of the unnecessary image data based on the specific gradations X1, X2, . . . . For example, there is a possibility that necessary image data may be erased when attempting to remove backside image data from an input image data which does not in fact include data concerning a backside image. There is another case that a backside image is intentionally desired to be copied.

In order to cope with versatile demands of copying, the image processing device of this invention enables a user to select the kind of unnecessary image to be removed or erased according to his or her needs. Specifically, the image processing device provides two removing process modes, i.e., undertone remove mode to remove undertone data only, and undertone/backside image remove mode to remove undertone and backside image data. These two modes are selectively operable by the user. This arrangement makes it possible to selectively remove undertone or both undertone and backside image according to a user's demand.

The image processing device may be provided with backside image remove mode to remove backside image data only while leaving undertone data. This mode is described as a modification of the embodiment in a later section.

In the histogram indicating gradation distribution of an input image data including both undertone and backside image data, generally, a first peak appearing on the lower gradation side corresponds to undertone data, and a second peak which follows the first peak corresponds to backside image data. In FIGS. 10 and 11, the first detected gradation X1 corresponds to an uppermost gradation of the undertone data, and the second detected gradation X2 corresponds to an uppermost gradation of the backside image data.

Accordingly, in the case where undertone remove mode is selected in the image processing device of this invention, a range of gradation (ranges L0 and L1) lower than the specific gradation X1 which is the uppermost gradation of the undertone data is set as the gradation range of the unnecessary image data. In the case where undertone/backside image remove mode is selected, on the other hand, a range of gradation (ranges L0, L1, and L2) lower than the specific gradation X2 which is the uppermost gradation of the backside image data is set as the gradation range of the unnecessary image data.

The unwanted gradation condition for determining a pixel to be removed from the input image data is set based on the thus obtained gradation range of the unnecessary image data. In this embodiment, the gradation range of the unnecessary image data is set as it is as a gradation range that satisfies the unwanted gradation condition in both of the modes.

In the case where undertone remove mode is selected, the specific gradation X1 is set as a unwanted gradation threshold value (also referred to as a removing gradation threshold value) $\alpha$ to set the unwanted gradation condition under which the target gradation lies in a gradation range having an upper limit equal to or lower than the threshold value. In the case where undertone/backside image remove mode is selected, the specific gradation X2 is set as the unwanted gradation threshold value $\alpha$ to set the unwanted gradation condition under which the target gradation lies in a gradation range having an upper limit equal to or lower than the threshold value.

In FIGS. 10 and 11, for sake of easy explanation, the embodiment is described with reference to one histogram. On an actual basis, unwanted gradation threshold values $\alpha c$, $\alpha m$, $\alpha y$ are determined respectively with respect to three color components of C, M, Y of the input image data to set unwanted gradation conditions with respect to the respective color components.

FIGS. 5A to 5C are examples of histograms in which the unwanted gradation threshold values $\alpha c$, $\alpha m$, $\alpha y$ are determined respectively in the case where undertone/backside image remove mode is selected.

(A-2) Unwanted Pixel Judging Means

The unwanted pixel judging means 332 judges whether a pixel is a unwanted pixel that is derived from the unnecessary image data and therefore to be removed based on the unwanted gradation condition determined by the unwanted gradation condition determining means 331d. The judgement is executed with respect to all the color components of C, M, Y composing the pixel by checking the input image data pixel by pixel. The input image data for judgement is not a processed data after smoothing by the smoothing processing means 331b but a raw input image data that has been inputted to the data removing unit 33.

The unwanted pixel judging means 332 judges that the pixel which satisfies all the mathematical expressions (2) to (4) as the unwanted pixel where gradations of the color components of C, M, Y are represented as Ic, Im, Iy, respectively.

$$Ic < \alpha c \quad (2)$$

$$Im < \alpha m \quad (3)$$

$$Iy < \alpha y \quad (4)$$

Figure 13:
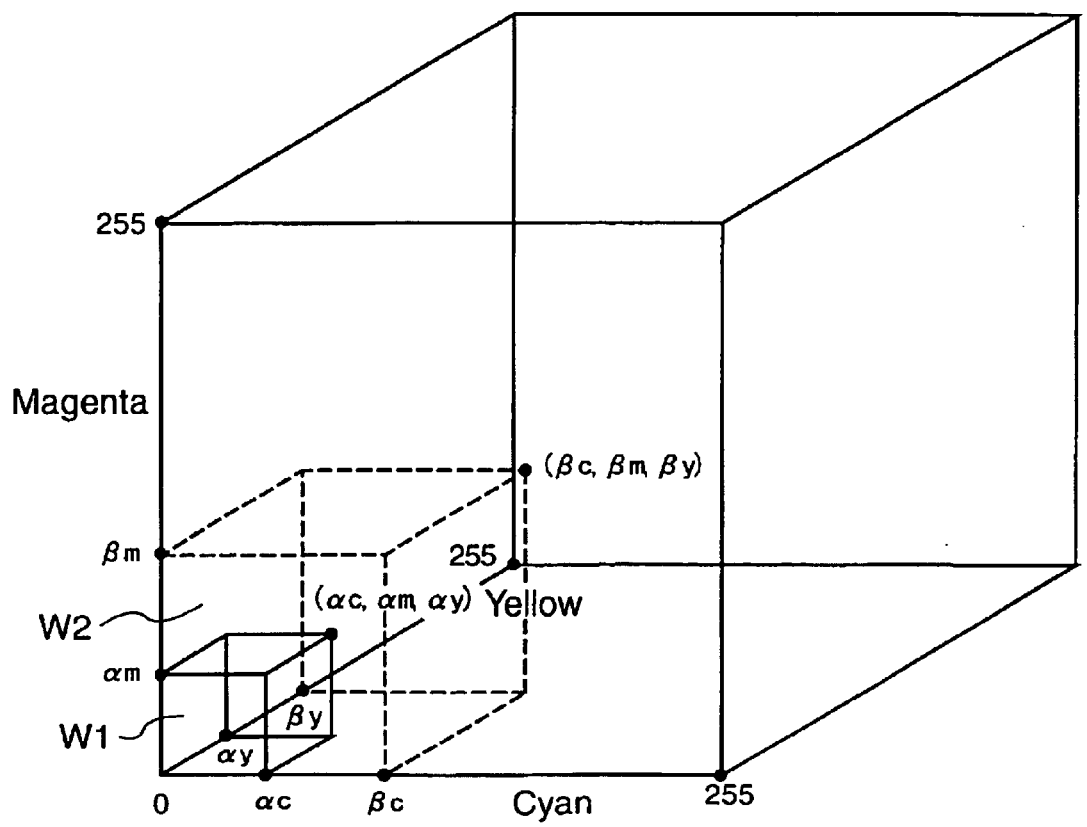
FIG. 13 is an explanatory diagram schematically showing a spatial area which satisfies a requirement for removing an unnecessary image data and a spatial area which satisfies a requirement for adjusting a gradation of an adjusting image area respectively in a three-dimensional space in which three different color components of cyan, magenta, and yellow are represented by x-, y-, and z-axes, respectively.

A pixel which has been judged as the unwanted pixel by the unwanted pixel judging means 332 with respect to the three color components is represented by a rectangular parallelepiped W1 in FIG. 13. FIG. 13 is a schematic diagram showing the respective gradations of the three color components of C, M, Y in terms of x-, y-, and z-axes in a three-dimensional space where the gradation of each of the color components ranges from 0 to 255, i.e., 256 gradations.

The image processing device in this embodiment judges the pixel which satisfies the unwanted gradation condition with respect to all the color components of C, M, Y as the unwanted pixel derived from the unnecessary image data. This arrangement prevents a possibility that a pixel which satisfies the unwanted gradation condition with respect to part of the color components is judged as the unwanted pixel and eliminates a likelihood that a reproduced color may be changed from the original color due to removal of part of the color components.

(A-3) Unwanted Pixel Gradation Conversion Means

The unwanted pixel gradation conversion means 333 converts gradation data of the pixel which has been judged as the unwanted pixel by the unwanted pixel judging means 332 into the lowest gradation outputtable by the image processing device, namely, to gradation value 0. The conversion is implemented with respect to each of the color components pixel by pixel. More specifically, the gradation conversion is represented by equations (5) to (7) where gradations of the unwanted pixel with respect to the color components of C, M, Y are Ic, Im, Iy, respectively.

$$Ic = 0 \quad (5)$$

$$Im = 0 \quad (6)$$

$$Iy = 0 \quad (7)$$

In this way, setting each of the gradations of all the color components of the unwanted pixel as an outputtable lowest gradation, i.e., gradation value 0, enables to substantially remove the image data of the unwanted pixel. This arrangement facilitates image data compression.

The gradation conversion with respect to the unwanted pixel corresponds to a spatial transformation in FIG. 13 where the pixel represented by the rectangular parallelepiped W1 is transformed into the original point 0 with respect to the three axes representing gradations of the color components of C, M, Y, respectively.

The unwanted pixel gradation conversion means 333 may convert the gradations of the unwanted pixels all at once after the unwanted pixel judging means 332 picks up all the unwanted pixels from the input image data. However, it may be preferable to implement the gradation conversion with respect to the unwanted pixel one by one each time the unwanted pixel judging means 332 picks up the unwanted pixel attributed to the unnecessary image data in order to enhance processing efficiency of the image processing device.

In this embodiment, the gradation conversion has been described for the case where the gradation of the unwanted pixel is converted into gradation value of 0. Alternatively, gradation of the unwanted pixel with respect to each of the color components maybe converted into a lowest gradation reproduceable by the image forming section 40 depending on the characteristic of the image forming section 40. As an altered form, each of the gradations of the unwanted pixel may be converted into a predetermined background gradation. In the latter altered arrangement, for example, image data which has been judged as undertone data of the original document can be converted into data of a background color different from the undertone of the original document to form an image with the converted background color.

Figure 6A:
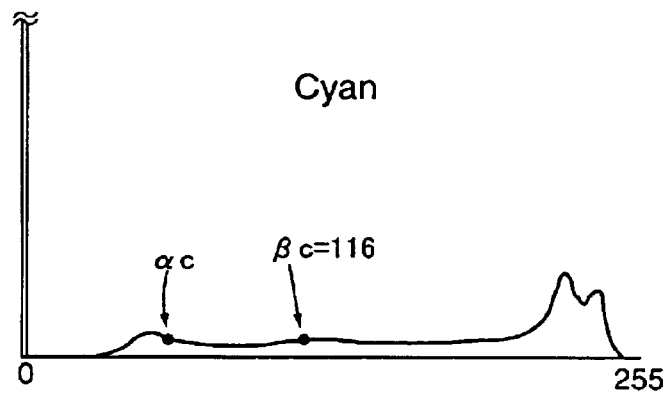
FIGS. 6A to 6C are examples of histograms after implementing an unnecessary image data removing process with respect to the histograms of FIGS. 5A to 5C, respectively.
Figure 6B:
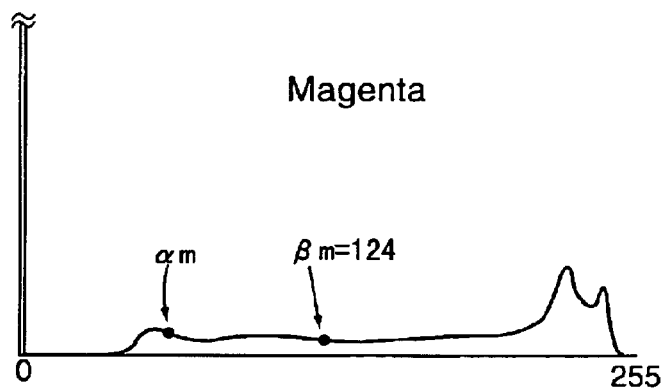
Figure 6C:
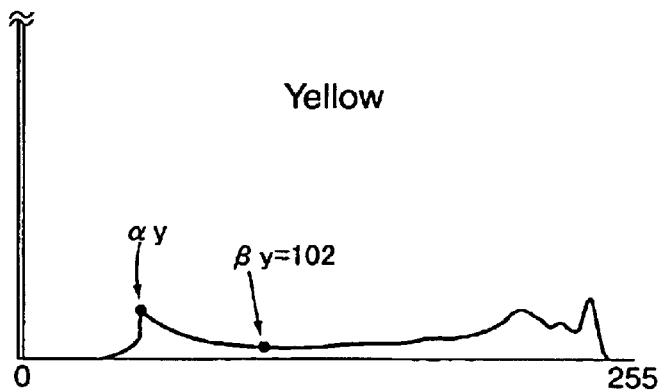

FIGS. 6A to 6C are histograms of the respective color components of C, M, Y after the gradation conversion with respect to the unwanted pixel. As can be seen from these histograms, much of gradation components lower than the unwanted gradation threshold values $\alpha c$, $\alpha m$, $\alpha y$ is removed after the gradation conversion although some of the gradation components lower than these unwanted gradation threshold values are left. The reason why some of the gradation components are left in the histograms is that some of the pixels have not been judged as the unwanted pixel and thus not been subjected to gradation conversion because these pixels satisfied the requirement of having a gradation lower than the corresponding unwanted gradation threshold value only with respect to one or two color components.

Next, a gradation adjusting unit 34 for implementing a certain gradation adjustment to an adjusting image area is described.

As mentioned above, as a result of removing the unwanted pixel having a lower gradation component in its most part with respect to all the three color components from the input image data, much of the lower gradation component of the input image data is erased, thereby generating a step portion (gradation difference) in the gradation distribution thereof. Particularly, if the image is of gradation data where the gradations are aligned in the order from lower to higher or vice versa, the gradations of the adjacent pixels become discontinuous, thereby likely to generate a degraded reproduced image such as a pseudo outline or a partial non-image formed area.

Figure 14A:
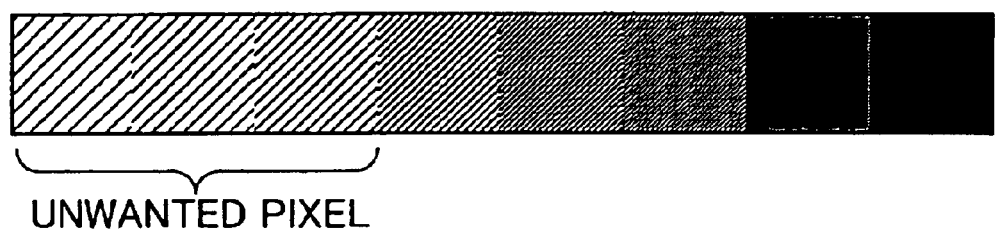
FIGS. 14A to 14C are diagrams schematically showing how a gradation difference appears and is eliminated.
Figure 14B:
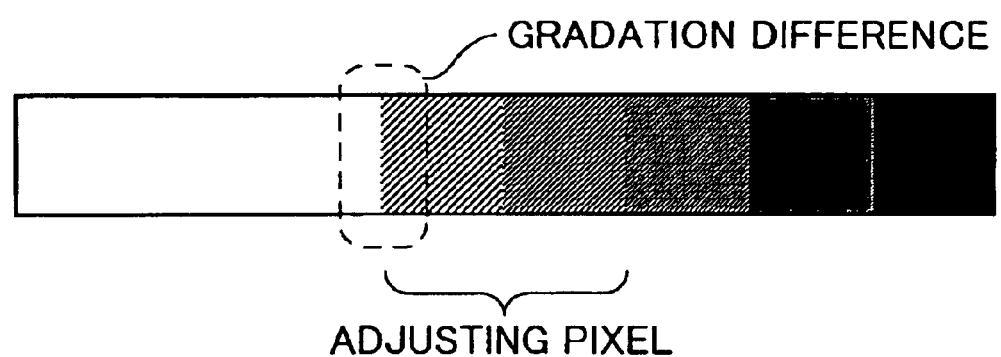
Figure 14C:
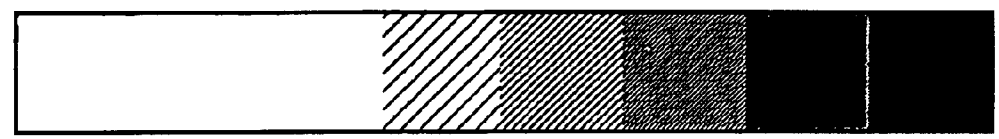

The above example is shown in FIGS. 14A to 14C. As can be seen from these figures, when pixels of lower gradation represented by the left-side columns in FIG. 14A are removed as the unwanted pixels, a gradation difference appears in a boundary region between the removed image data and the remaining part of the input image data, as shown in FIG. 14B. The gradation adjusting unit 34 eliminates or suppresses the gradation difference in the boundary region by setting an image area having a gradation closer to the gradation of the unwanted pixel as an adjusting image area to lower the gradation of an adjusting pixel extracted from the adjusting image area.

Specific arrangements of the elements of the gradation adjusting unit 34 are described in the following section one by one.

(B-1) Adjusting Gradation Condition Setter Means

The adjusting gradation condition setter means 341 sets an adjusting gradation condition for extracting an adjusting pixel, which is a target pixel to be processed in the gradation adjusting process. Specifically, adjusting gradation threshold values $\beta c$, $\beta m$, $\beta y$ are calculated by multiplying the unwanted gradation threshold values $\alpha c$, $\alpha m$, $\alpha y$ by two in accordance with equations (8) to (10) with respect to the color components of C, M, Y, respectively to set the adjusting gradation condition that an adjusting pixel should have gradations lower than the adjusting gradation threshold values $\beta c$, $\beta m$, $\beta y$, respectively with respect to the color components of C, M, Y.

$$\beta c = 2 \cdot \alpha c \tag{8}$$

$$\beta m = 2 \cdot \alpha m \tag{9}$$

$$\beta y = 2 \cdot \alpha y \tag{10}$$

After removing the unnecessary image data, a gradation difference is generated in an area having a gradation closer to the unwanted gradation threshold values $\alpha c$, $\alpha m$, $\alpha y$, which results in a degraded reproduced image such as a pseudo outline and a non-image formed area. The fact that much of the gradation components lower than the unwanted gradation threshold values $\alpha c$, $\alpha m$, $\alpha y$ are erased from the input image data means that the size of the gradation range to be removed from the input image data depends on the size of the unwanted gradation threshold value $\alpha c$ ($\alpha m$ or $\alpha y$), and that the size of the gradation range to be removed determines a gradation difference causing a degraded image reproduction.

In view of the above, setting the adjusting gradation threshold values $\beta c$, $\beta m$, $\beta y$ based on the unwanted gradation threshold values $\alpha c$, $\alpha m$, $\alpha y$ respectively and implementing a gradation conversion to the adjusting pixel depending on the size of the adjusting gradation threshold value $\beta c$, $\beta m$, $\beta y$ enables to suppress the gradation difference in conformance with the size of the gradation difference.

Setting the adjusting gradation threshold values $\beta c$, $\beta m$, $\beta y$ based on the unwanted gradation threshold values $\alpha c$, $\alpha m$, $\alpha y$ enables to facilitate and expedite computation of the adjusting gradation threshold values $\beta c$, $\beta m$, $\beta y$ since the unwanted gradation threshold values $\alpha c$, $\alpha m$, $\alpha y$ have been already determined.

Further, since the adjusting gradation condition sets the requirement that the adjusting pixel should have a gradation not greater than the predetermined adjusting gradation threshold value, adjusting pixel extracting process, which is described below, can be facilitated and expedited in accordance with a simplified computation.

(B-2) Adjusting Pixel Judging Means

The adjusting pixel judging means 342 judges whether a pixel of the input image data after the unnecessary image data removal by the data removing unit 33 is an adjusting pixel which satisfies the aforementioned adjusting gradation condition with respect to all the gradations of the color components of C, M, Y.

Specifically, the adjusting gradation judging means 342 checks the remaining pixels one by one and judges that the checked pixel is the adjusting pixel in the case where the checked pixel satisfies all the following mathematical expressions (11) to (13) where Ic, Im, Iy respectively represent gradations of the color components of C, M, Y of the checked pixel.

$$Ic < \beta c \tag{11}$$

$$Im < \beta m \tag{12}$$

$$Iy < \beta y \tag{13}$$

The pixel which has been judged as the adjusting pixel by the adjusting gradation judging means 342 possesses a spatial area corresponding to a rectangular parallelepiped W2 devoid of the rectangular parallelepiped W1 representing the unwanted pixel in the three-dimensional space of FIG. 13.

In this way, in the image processing device of this embodiment, the pixel which satisfies the adjusting gradation condition with respect to all the color components of C, M, Y is judged as the adjusting pixel attributed to the adjusting image area, and gradation conversion is implemented with respect to the adjusting pixel which is part of the input image data. In this arrangement, there can be prevented an overall color change of a reproduced image due to change of the gradations over the entirety of the input image data. Further, setting an appropriate adjusting gradation condition enables to pick up a minimal number of pixels necessary for gradation adjustment of the adjusting pixel. Thereby, gradation difference can be eliminated or suppressed while suppressing color change of the reproduced image as much as possible, thus preventing a degraded image reproduction.

(B-3) Adjusting Pixel Gradation Conversion Means

The adjusting pixel gradation conversion means 343 implements a certain gradation conversion with respect to the adjusting pixel to eliminate or suppress a gradation difference. As shown in FIG. 3, the adjusting pixel gradation conversion means 343 is divided into the following three elements:

(B-3-1) target color component setter means 343a (B-3-2) common gradation lowering rate setter means 343b (B-3-3) gradation conversion implementing means 343c (B-3-1) Target Color Component Setter Means The target color component setter means 343a sets a specific color among the color components of C, M, Y as a target color component N with respect to all the adjusting pixels one by one. The target color component N is a color component in the adjusting pixel having a largest possibility of generating the gradation difference.

Specifically, the target color component N is a color component having a gradation with a smallest distance relative to the adjusting gradation threshold value with respect to each of the adjusting pixels. The relative distance to the adjusting gradation threshold value in this embodiment is a ratio of a difference between the gradation of the adjusting pixel and the adjusting gradation threshold value to the adjusting gradation threshold value. Relative distances Lc, Lm, Ly can be calculated in accordance with the following equations (14) to (16) where Ic, Im, Iy are gradations of the color components of C, M, Y of the adjusting pixel, and $\beta c$, $\beta m$, $\beta y$ are adjusting gradation threshold values of the respective color components:

$$Lc=(\beta c-Ic)/\beta c \quad (14)$$

$$Lm=(\beta m-Im)/\beta m \quad (15)$$

$$Ly=(\beta y-Iy)/\beta y \quad (16)$$

The target color component N is a color component having the greatest value among Lc, Lm, Ly.

The reason for setting the color component having a gradation closest to the adjusting gradation threshold value as the target color component N is as follows.

Generally, most of the gradation difference generated in an area having a gradation closer to the unwanted gradation threshold value $\alpha c$ ($\alpha m$ or $\alpha y$) exhibits a characteristic that one specific color component has a gradation closer to the corresponding unwanted gradation threshold value and the other color components have a gradation sufficiently smaller than the corresponding unwanted gradation threshold value. When the gradation of the specific one of the color components is lower than the corresponding unwanted gradation threshold value, the gradation is converted into a background gradation (gradation value of 0). On the other hand, when the gradation of the specific one of the color components is greater than the corresponding unwanted gradation threshold value, the gradation is maintained as it is. In other words, it can be said that the color component having the gradation closer to the corresponding unwanted gradation threshold value causes the gradation difference.

More specifically, let's say that a pixel of a certain pixel group is such that the gradation Ic of the color component C and the gradation Im of the color component M are presumed to be gradations sufficiently smaller than the corresponding unwanted gradation threshold values $\alpha c$ and $\alpha m$, respectively. In such a case, a judgement as to whether the pixel of the pixel group is the unwanted pixel depends on a judgement as to whether the gradation Iy of the color component Y of the pixel is greater or smaller than the unwanted gradation threshold value $\alpha y$. When the gradation Iy of the color component Y is lower than the unwanted gradation threshold value $\alpha y$, the pixel is judged as the unwanted pixel with the result that all the gradations Ic, Im, Iy are converted into gradation value of 0. At this time, since a gradation change rate (lowering rate) of the gradation Iy is largest, a largest gradation difference is generated in a boundary region between the unwanted pixel and proximate pixels with respect to the color component of Y.

To sum up, the gradation of the color component primarily responsible for generation of the gradation difference has a largest relative distance to the corresponding adjusting gradation threshold value as compared with the other color components. Therefore, it can be said that the thus obtained target color component N causes a gradation difference.

Figure 15:
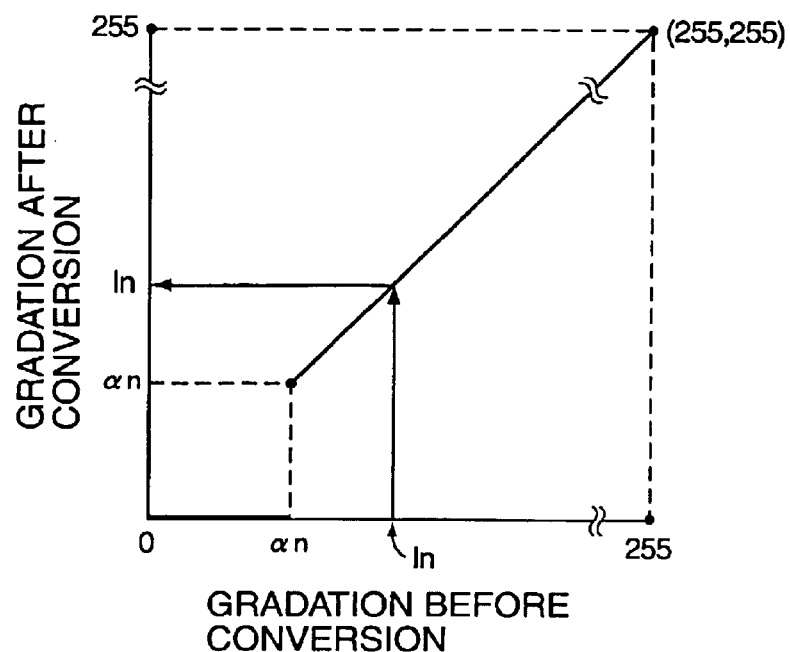
FIG. 15 is a graph indicative of a gradation conversion curve for removing an unnecessary image data.

FIG. 15 shows a gradation conversion curve used for converting the remaining one of the color components of the pixel where the other two of the color components are judged to have a gradation lower than the corresponding unwanted gradation threshold value. Note that the remaining one of the color components is generally the target color component. In FIG. 15, horizontal axis represents gradation before conversion and vertical axis represents gradation after conversion.

For instance, let it be assumed that the gradation of a certain color component N of a certain pixel is In. According to the gradation conversion curve, the gradation In cannot be converted if In$\geq\alpha$n where $\alpha$n is the unwanted gradation threshold value. Therefore, the gradation after conversion is set as the gradation In. On the other hand, if In<$\alpha$n, the pixel having the gradation In is the unwanted pixel. Accordingly, the gradation In is converted into gradation value of 0. Thus, as shown in FIG. 15, a gradation difference in accordance with the size of $\alpha$n is generated in the vicinity of the unwanted gradation threshold value $\alpha$n.

(B-3-2) Common Gradation Lowering Rate Setter Means

The common gradation lowering rate setter means 343b calculates a gradation conversion function capable of efficiently suppressing the gradation difference with respect to the target color component N to set a gradation lowering rate r of the target color component N which has been calculated based on the gradation conversion function, as a common gradation lowering rate R.

The gradation In (where n is either one of c, m, y) before conversion of the target color component N (where N is either one of C, M, Y) lies within a gradation range not smaller than the unwanted gradation threshold value $\alpha$n and smaller than the adjusting gradation threshold value $\beta$n. The target color component N is generally a color component primarily responsible for generation of the gradation difference due to removal of the gradation equal to or lower than the unwanted gradation threshold value $\alpha$n thereof. Therefore, converting the gradation value In of the target color component N of the adjusting pixel which lies in the range not smaller than $\alpha$n and smaller than $\beta$n into a gradation ranging from 0 to smaller than $\beta$n enables to supplement the gradation equal to or smaller than the unwanted gradation threshold value an, thereby suppressing the gradation difference.

Figure 16:
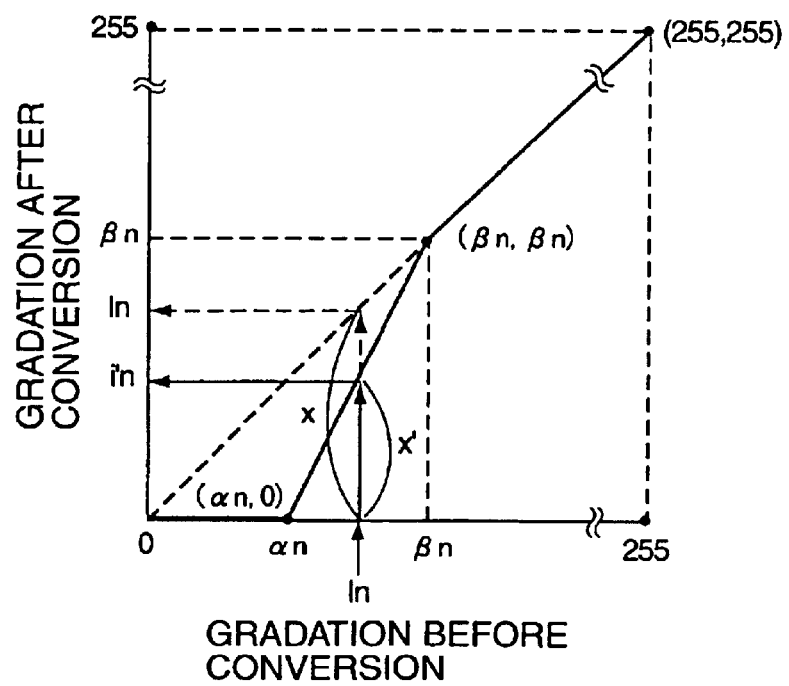
FIG. 16 is a graph indicative of a gradation conversion curve for gradation adjustment of an adjusting image area.

More specifically, referring to FIGS. 15 and 16, in the state where the unnecessary image data has been removed, the gradation range having a gradation lower than the unwanted gradation threshold value $\alpha$n and including the value $\alpha$n is erased, thereby generating a gradation difference in the proximity of the unwanted gradation threshold value $\alpha$n (see FIG. 15). Assuming that the target color component N is of an adjusting pixel, the gradation In of the target color component N of the adjusting pixel lies between the unwanted gradation threshold value $\alpha$n and the adjusting gradation threshold value $\beta$n. Implementing a gradation conversion in such a manner as to extend the gradation range of the target color component N of the adjusting pixel ranging from $\alpha$n to $\beta$n to a gradation ranging from 0 to $\beta$n enables to make the gradation distribution after the conversion continuous in a manner ranging from 0 to 255, thus reducing the gradation difference.

FIG. 16 shows an example of gradation conversion. The gradation conversion in FIG. 16 is such that gradation is converted in accordance with a gradation conversion curve (in this case, shown by a straight line) which interpolates the gradation In of the target color component N of the adjusting pixel between ($\alpha$n, 0) and ($\beta$n, $\beta$n).

FIG. 16 shows an example of the above gradation conversion. In FIG. 16, the gradation conversion in accordance with the linear gradation conversion curve is represented by a function shown by equation (17) where In represents gradation of the target color component N before conversion and In' represents gradation after conversion.

$$In'=(\beta/(\beta-\alpha))\cdot In-\beta \qquad (17)$$

The gradation lowering rate r of the target color component N is calculated in accordance with equation (18).

$$\begin{aligned} r &= In'/In \\ &= \beta/(\beta-\alpha) - \beta/In \end{aligned} \qquad (18)$$

Converting the gradation of the adjusting pixel based on the thus calculated gradation lowering rate r suppresses the gradation difference of the target color component N. In this embodiment, the gradation lowering rate r of the target color component N is set as the common gradation lowering rate R represented by the following equation (19).

$$R=r \qquad (19)$$

The common gradation lowering rate R is a gradation lowering rate used for converting the gradation with respect to all the three components of the adjusting pixel.

(B-3-3) Gradation Conversion Implementing Means

The gradation conversion implementing means 343c implements gradation conversion with respect to gradations Ic, Im, Iy of the color components of C, M, Y of the adjusting pixel based on the common gradation lowering rate R which has been set by the common gradation lowering rate setter means 343b.

Specifically, the gradation conversion by the gradation conversion implementing means 343c is represented by equations (20) to (22) where Im, Ic, Iy represent gradations of the color components of C, M, Y of the adjusting pixel before conversion, and Ic', Im', Iy' represent respective gradations after conversion.

$$Ic'=R\cdot Ic \qquad (20)$$

$$Im'=R\cdot Im \qquad (21)$$

$$Iy'=R\cdot Iy \qquad (22)$$

In the case where image data is processed in terms of digital value, the gradations of the respective color components are represented by an integer. In this case, Ic', Im', Iy' after the conversion may be set to an appropriate integer by rounding off the respective values.

Thus, gradation of each of the adjusting pixels is converted at a substantially same gradation lowering rate (common gradation lowering rate R) with respect to all the color components of C, M, Y. This arrangement suppresses change in hue of a reproduced image although the brightness of the reproduced image may be changed.

To sum up the above, according to the gradation conversion of the adjusting pixel by the gradation conversion implementing means 343c, gradation conversion is implemented only with respect to part of the pixels constituting the input image data. Furthermore, gradations of the adjusting pixel are converted at the substantially same rate with respect to all the three color components. This arrangement makes it possible to suppress the gradation difference while suppressing change of a color of a reproduced image as much as possible so as to prevent a degraded color image reproduction.

Figure 7A:
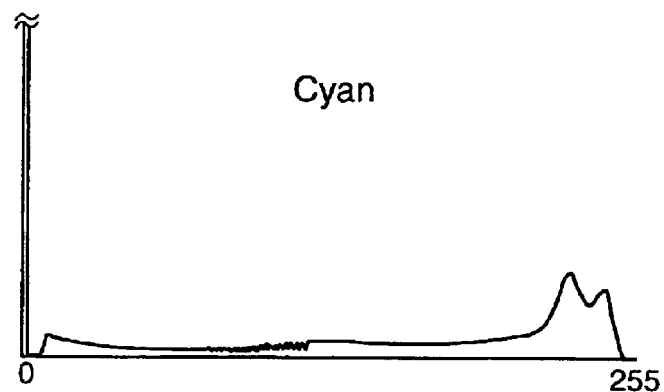
FIGS. 7A to 7C are examples of histograms after implementing a gradation adjustment to an adjusting image area with respect to the histograms of FIGS. 6A to 6C, respectively.
Figure 7B:
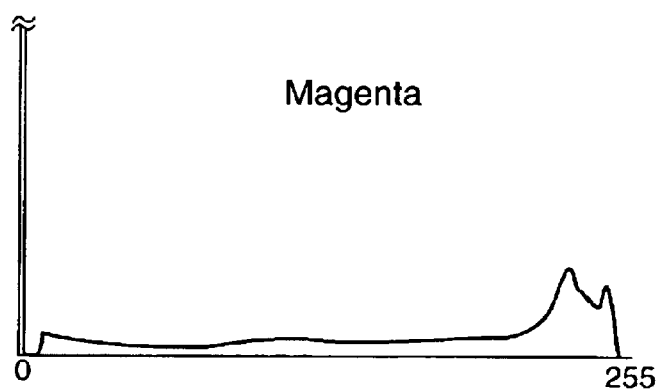
Figure 7C:
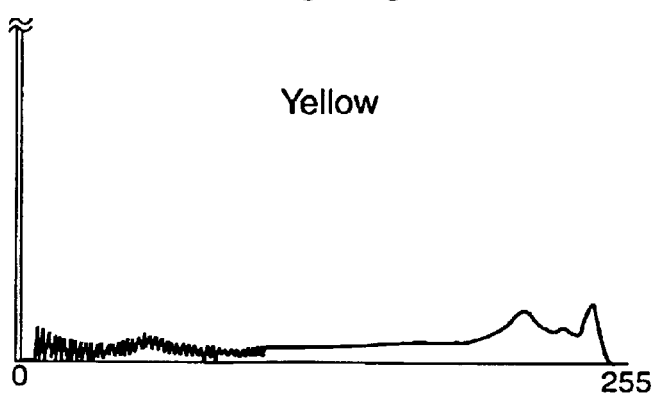

FIGS. 7A to 7C are histograms showing gradation distribution of the adjusting image area after the gradation conversion with respect to the histograms of FIGS. 6A to 6C showing the gradation distribution before removal of unnecessary image data. As shown in these histograms, implementing the gradation conversion with respect to the adjusting image area supplements lower gradation components which have been removed by removal of the unnecessary image data.

As mentioned above, according to an aspect of the inventive image processing device, a pixel which satisfies the unwanted gradation condition with respect to all the color components of C, M, Y is judged as the unwanted pixel attributed to the unnecessary image data to be removed. In other words, the pixel which satisfies the unwanted gradation condition with respect to part of the color components is not judged as the unwanted pixel. This arrangement prevents color change in a reproduced image due to removal of the gradation of part of the color components. Thus, unnecessary image data can be securely removed while suppressing degraded image reproduction of the input image data.

According to another aspect of this invention, the unwanted gradation condition is set color component by component by referring to gradation data of the input image. This arrangement enables to set an adequate condition depending on the characteristic of the input image data and accurately extract unnecessary image data included in the input image data to remove the unnecessary image data.

According to yet another aspect of this invention, a user can select which part of the input image data should be removed as the unnecessary image data among a variety of kinds of data such as undertone data and backside image data to set the unwanted gradation condition based on the gradation range of the selected unnecessary image data. This arrangement is user-friendly because the image processing device can cope with versatile demands of image processing such as what kind of image data to be removed or to what extent the image data to be removed.

The image processing device of the invention can handle the following situation. Removing the unnecessary image data may likely to generate a gradation difference. According to still another aspect of this invention, however, a pixel which satisfies the adjusting gradation condition with respect to all the color components of C, M, Y is judged as the adjusting pixel to implement gradation conversion of the adjusting pixel. This arrangement enables to suppress the gradation difference without undesirably changing the colors of all the pixels of the input image data, thereby preventing degraded image reproduction.

According to a further aspect of this invention, the adjusting gradation condition for extracting the adjusting image area is set color component by component depending on the unwanted gradation condition. This arrangement enables to set the gradation range of the adjusting image area in conformance with the size of the gradation difference to suppress the gradation difference while minimizing the size of the adjusting image area having a possibility of color change.

According to yet another aspect of this invention, the gradation conversion with respect to each of the adjusting pixels of the adjusting image area is conducted by extracting a color component primarily responsible for generation of the gradation difference as a target color component with respect to all the adjusting pixels one by one. This arrangement enables to adequately suppress the gradation difference with respect to the target color component, thereby appropriately suppressing the gradation difference.

According to a still further aspect of this invention, gradation conversion with respect to each of the adjusting pixels of the adjusting image area is implemented based on the substantially same gradation lowering rate common in all the color components, namely, based on an appropriate gradation lowering rate for the target color component with respect to all the adjusting pixels one by one. This arrangement enables to minimize change in hue of a reproduced image without varying balance of the color components of each of the adjusting pixels.

One embodiment of the present invention has been described in the above section. An image processing device according to this invention is not limited to the above, and may take the following modification and alterations.

(1) The image processing device of this invention in the embodiment is incorporated in a color copier. Alternatively, the image processing device may be incorporated in a color facsimile machine. In the altered arrangement, image data that has been read by a scanner of the facsimile machine is treated as input image data for image processing in data transmission, whereas image data that has been received by the facsimile machine is treated as input image data for image processing in data reception. As an altered form, image processing may be implemented with respect to input image data that has been read by a scanner of an external device. As a further altered form, image data may be outputted to a printer as an external device for image processing.

(2) In the embodiment, the image processing device implements image processing with respect to input image data composed of three color components of C, M, Y. The input image data may be composed of three primary colors of R, G, B.

(3) In the embodiment, the unwanted gradation condition is set based on a histogram, i.e., gradation distribution of the input image data. As far as the gradation range of the unnecessary image data can be specified, any setter means may be applicable. Particularly, in the case where color paper of a specific color is used, the gradation range of the unnecessary image data is generally known. In such a case, the unwanted gradation condition can be determined based on the known gradation range.

(4) In the embodiment, the unwanted gradation condition is set based on the gradation data of all the pixels of the input image data. Alternatively, the unwanted gradation condition may be determined based on gradation data of part of the pixels of the input image data. In the altered arrangement, part of the pixels may be some of the pixels that have been arbitrarily picked up from the input image data or may be a pixel having a lower probability of being derived from necessary image data such as corner pixels of the input image data.

(5) In the embodiment, a specific gradation has been searched for after implementing a smoothing process with respect to the curve of the histogram that has been produced from the input image data. Alternatively, the smoothing process may be omitted.

(6) In the embodiment, a gradation that satisfies any one of the conditions (I) to (IV) is set as a specific gradation, and the unwanted gradation condition is set based on the specific gradation. Alternatively, as far as the gradation range of the unnecessary image data is detectable, the specific gradation may be set based on a judgement as to whether the checked gradation satisfies the conditions (I) and (II), or (I), (II), and (III), or (I), (II), and (IV), or any one of (I) to (IV) and other factor(s).

(7) In the embodiment, a specific gradation is detected based on the histogram, the gradation range of the unnecessary image data is determined based on the specific gradation, and the gradation condition for extracting the gradation range of the unnecessary image data is set as the unwanted gradation condition. Alternatively, as far as the condition for removing the unnecessary image data is securely obtainable, a condition for extracting a gradation range slightly wider than the gradation range of the unnecessary image data may be set as the unwanted gradation condition. As an altered form, in the case where a necessary image area is required to be maintained even if part of the unnecessary image data is left, a condition for extracting a gradation range slightly narrower than the gradation range of the unnecessary image data may be set as the unwanted gradation condition.

(8) In the embodiment, when setting the unwanted gradation condition, undertone remove mode and undertone/backside image remove mode are selectively settable by a user. Alternatively, an arrangement may be applicable such that the image processing device itself automatically judges as to what kind of unnecessary image data such as undertone data and backside image data exists depending on the kind of input image data and selects the mode based on a judgement result. For instance, the judgement may be made based on the size of the first and second specific gradation values X1, X2 of the color components of C, M, Y or the ratio of the first value X2 to the second value X2.

(9) In the embodiment, the unwanted pixel is removed by converting the gradation of the unwanted pixel to gradation value of 0, namely, by substantially eliminating the gradation data of the unwanted pixel. As an altered arrangement, the gradation of the unwanted pixel may be converted into a gradation of a background color. In the altered arrangement, output image data having an arbitrary undertone can be obtained.

(10) In the embodiment, undertone remove mode of removing only undertone data from the unnecessary image data and undertone/backside image remove mode of removing both of undertone data and backside image data are selectable. Alternatively, backside image remove mode of removing only backside image data may be additionally settable.

Figure 17:
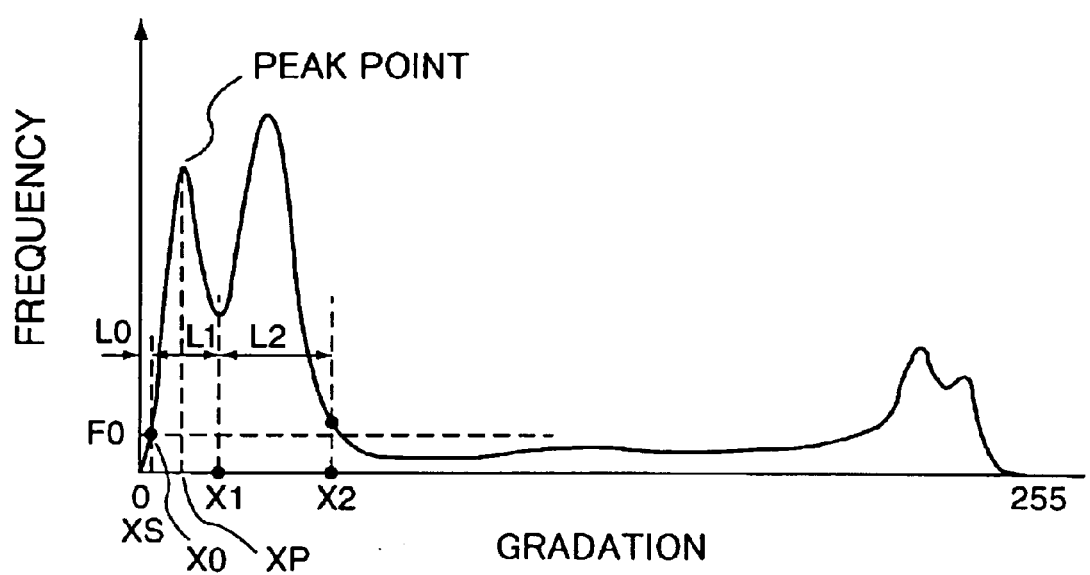
FIG. 17 is an explanatory diagram of image processing in the case where backside image remove mode is set.

A case where backside image remove mode is set is described with reference to the histogram of FIG. 17 which is a histogram of one of the color components of C, M, Y, the gradation range or width L1 of the first peak appearing on lower gradation side represents gradation distribution of the undertone data, and the gradation range or width L2 of the second peak that follows the first peak represents gradation range of the backside image data. In the backside image remove mode, setting the condition for extracting the gradation width L2 of the second peak as the unwanted gradation condition enables to remove the unwanted pixel attributed to the backside image data from the input image data. In this case, the unwanted gradation condition includes the gradation not smaller than the gradation X1 and not greater than the gradation X2 with respect to each of the color components.

In the above case, it is preferable to convert the gradation of the unwanted pixel corresponding to the backside image data into a gradation of undertone data. The gradation of undertone data can be set by any setter means, for example, based on the gradation width L1 of the first peak corresponding to the undertone data. Particularly, it may be preferable to set the gradation value XP of the peak point of the first peak as a representative gradation of the undertone data to convert the gradation of unnecessary image data (in this case, backside image data) into the gradation XP with respect to all the color components one by one.

(11) In the embodiment, unnecessary image data is removed based on the assumption that the unnecessary image data consists of one kind of undertone data and one kind of backside image data. Even if input image data includes three or more different kinds of unnecessary image data such that undertone data of plural colors and backside image data of plural colors coexist, all these kinds of unnecessary image data can be removed by implementing the following process. Three or more specific gradations are detected from each of the histograms, and the unwanted gradation condition is determined by setting the highest specific gradation among the detected gradations as the unwanted gradation threshold value depending on the number of kinds of unnecessary image data.

(12) In the embodiment, gradation adjustment of the adjusting image area is implemented together with unnecessary data removal. Alternatively, the gradation adjustment of the adjusting image area may be omitted. Particularly, in the case where no gradation difference is generated, or the gradation difference is negligibly small, or no gradation change of the image data other than the unnecessary image data is required, gradation adjustment of the adjusting image area is not necessary.

(13) In the embodiment, adjusting gradation threshold values $\beta c$, $\beta m$, $\beta y$ are respectively set based on the unwanted gradation threshold values $\alpha c$, $\alpha m$, $\alpha y$. As an altered form, each of the adjusting gradation threshold values $\beta c$, $\beta m$, $\beta y$ may be set at a certain value without considering the unwanted gradation threshold values $\alpha c$, $\alpha m$, $\alpha y$. For instance, adjusting gradation threshold values may be set in advance with respect to the color components of C, M, Y, respectively.

(14) In the embodiment, the adjusting gradation threshold values $\beta c$, $\beta m$, $\beta y$ are set by multiplying the unwanted gradation threshold values $\alpha c$, $\alpha m$, $\alpha y$ by two. An appropriate magnification ratio may be set by considering to what extent the gradation difference is required to be suppressed or to what extent the number of adjusting pixels having a possibility of color change due to gradation difference suppression may be allowed to decrease. Alternatively, a gradation value away from the unwanted gradation threshold value $\alpha c$ ($\alpha m$, or $\alpha y$) by a certain gradation width may be set as the adjusting gradation threshold value $\beta c$ ($\beta m$, $\beta y$).

(15) In the embodiment, gradation conversion of extending the gradation range of $\alpha n$ to $\beta n$ to the gradation range of 0 to $\beta n$ in accordance with the linear gradation conversion curve as shown in FIG. 16 is implemented. Alternatively, an arbitrary quadratic (or non-linear) gradation conversion curve such as the one represented by a quadratic function may be adopted. In the altered arrangement, since the gradation range having a gradation equal to or greater than the adjusting gradation threshold value is not subjected to gradation conversion, it may be preferable to implement the following process. The gradation change amount in proximity of the adjusting gradation threshold value may be minimized to continuously connect the gradation area which is not subjected to gradation conversion (gradation area including the gradation equal to or greater than the adjusting gradation threshold value) and the gradation area which is subjected to gradation conversion (gradation area including the gradation not larger than the adjusting gradation threshold value).

More specifically, a quadratic function shown by equation (23) may be applicable where In represents gradation before conversion and In' represents gradation after conversion.

$$In'=-In^2/\alpha n+5\cdot In-4\cdot \alpha n \qquad (23)$$

Figure 18:
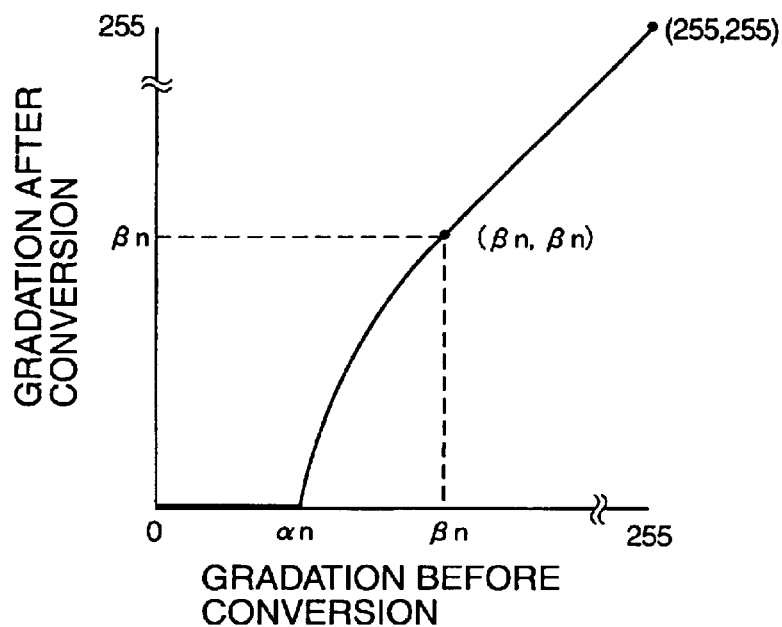
FIG. 18 is a graph indicative of an example of a gradation conversion curve which is a quadratic curve used in gradation adjustment of an adjusting image area.

The gradation conversion curve in accordance with equation (23) is shown in FIG. 18. According to the gradation conversion curve, the gradation curve in proximity of the unwanted gradation threshold value $\alpha n$ can be continuously connected while extensively converting the gradation range of $\alpha n$ to $\beta n$ to the gradation range of 0 to $\beta n$ and maintaining the slope of the point ($\beta n$, $\beta n$) at 1.

According to the above gradation conversion curve, since the function is quadratic, gradation conversion can be implemented by a simplified computation.

Figure 19:
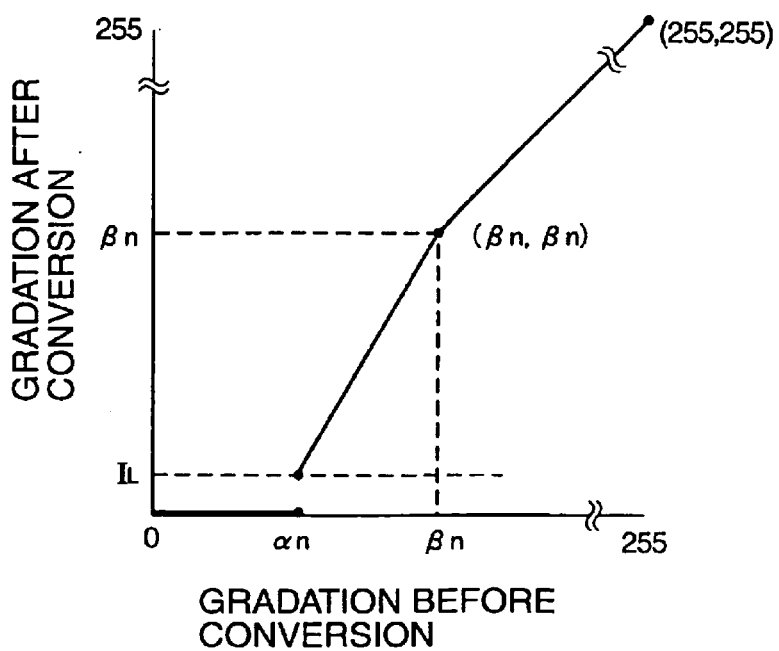
FIG. 19 is a graph indicative of an example of a gradation conversion curve in the case where a gradation conversion range is defined by setting an output limit by an image forming section of the color copying machine as a lowest gradation for gradation adjustment of the adjusting image area.

(16) In the embodiment, gradation conversion of extending the gradation range of $\alpha n$ to $\beta n$ to the gradation range of 0 to $\beta n$ in accordance with the linear gradation conversion curve as shown in FIG. 16 is implemented. Alternatively, the lowermost gradation of the gradation range after the conversion may be set to a lowest gradation (reproduceable limit gradation) IL which is outputtable by the image forming section 40. As far as a linear gradation curve is used, the gradation range of $\alpha n$ to $\beta n$ before conversion can be converted into the gradation range of IL to $\beta n$, as shown in FIG. 19.

(17) In the embodiment, when implementing gradation conversion with respect to the adjusting image area, a target color component is determined each time the adjusting pixel is picked up, and gradation conversion with respect to all the color components is implemented based on an appropriate gradation lowering rate for the target color component. Alternatively, a common gradation lowering rate may be set without considering the target color component, and gradation conversion may be implemented based on the common gradation lowering rate.

(18) In the embodiment, as shown in FIG. 3, gradation of the adjusting image area is adjusted after the unnecessary image data removal. As far as the processing order is settled in a state that each processing is enabled, the processing order is not limited to what is disclosed in the embodiment. For instance, after setting the unwanted gradation condition and the adjusting gradation condition, the pixels constituting the input image data may be checked one by one. When the gradation of the checked pixel satisfies the unwanted gradation condition, the checked pixel may be set as the unwanted pixel and gradation conversion may be implemented to remove the unwanted pixel. When the gradation of the checked pixel satisfies the adjusting gradation condition, the checked pixel may be set as the adjusting pixel, and gradation conversion is implemented to adjust the gradation of the adjusting pixel.

This application is based on patent application No. 11-265219 filed in Japan, the contents of which are hereby incorporated by references.

As this invention may be embodied in several forms without departing from the spirit of essential characteristics thereof, the present embodiment is therefore illustrative an not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. An image processing device for applying a certain process to input image data in accordance with gradation data of a plurality of color components for each pixel of an image represented by the input image data, comprising:
   an unwanted gradation condition provider for providing a condition for determination of unwanted gradation for each of a plurality of color components;
   an unwanted pixel determining unit for determining pixel by pixel whether all the gradation data for each pixel of the image in regard to the color components satisfy respective unwanted gradation conditions provided by the unwanted gradation condition provider; and
   an unwanted pixel gradation converter for converting, into a predetermined gradation, the gradation data of the plurality of color components of the pixel having gradation data that have been determined to satisfy the unwanted gradation conditions by the unwanted pixel determining unit, said predetermined gradation being set with respect to each one of the color components.

2. The image processing device according to claim 1, wherein said unwanted gradation condition provider includes an unnecessary image gradation determining unit for determining, for each of the color components, a gradation of an unnecessary image which is deemed to be unnecessary for reproduction, and an unwanted gradation condition setting means for setting the unwanted gradation condition in accordance with the gradation of unnecessary image data.

3. The image processing device according to claim 2, wherein said unnecessary image gradation determining unit is adapted to determine a gradation of an undertone portion in the image represented by the input image data as the gradation of the unnecessary image.

4. The image processing device according to claim 2, wherein said unnecessary image gradation determining unit is adapted to determine a gradation of an undertone portion and a backside image portion in the image represented by input image data as the gradation of the unnecessary image.

5. The image processing device according to claim 2, wherein said unnecessary image gradation determining unit is adapted to determine a gradation of a backside image portion in the image represented by the input image data as the gradation of the unnecessary image.

6. The image processing device according to claim 2, wherein said unnecessary image gradation determining unit is adapted to determine a gradation range of the unnecessary image with respect to each one of the color components in accordance with gradation data of the input image data to set the unwanted gradation condition.

7. The image processing device according to claim 6, wherein the unnecessary image gradation determining unit includes a histogram providing unit for providing a histogram showing the number of pixels at each gradation as a frequency of gradation, with respect to each of the color components of the input image data, a frequency checker for checking the frequency of each gradation from a lower gradation, a gradation detector for detecting, in the histogram, a specific gradation that satisfies a predetermined detection condition with respect to each one of the color components, and a gradation range determining unit for determining the gradation range of the unnecessary image data based on the detected gradation.

8. The image processing device according to claim 7, wherein the unnecessary image gradation determining unit includes a smoothing processing unit for smoothing a curve in the histogram.

9. The image processing device according to claim 7, wherein the detection condition for the detection of the specific gradation is either (I) or (II) presented below:
   (I) the specific gradation is given a gradation value at which a slope of a curve in the histogram shifts from negative to positive;
   (II) the specific gradation is given a gradation value at which a change rate of a slope of a curve in the histogram shifts from negative to positive.

10. The image processing device according to claim 7, wherein the detection condition for the detection of the specific gradation is either (I), (II), or (III) presented below:
    (I) the specific gradation is given a gradation value at which a slope of a curve in the histogram shifts from negative to positive;
    (II) the specific gradation is given a gradation value at which a change rate of a slope of a curve in the histogram shifts from negative to positive;
    (III) the specific gradation is given a gradation value at which a slope of a curve in the histogram is negative, and a ratio of the frequency of the gradation value to a sum of the frequencies of the gradations lower than the gradation value is or is smaller than a predetermined value.

11. The image processing device according to claim 9, wherein the unnecessary image gradation determining unit is adapted to set, as a detection start gradation, a lowest gradation having a frequency exceeding a predetermined frequency and start detection of the gradation from the detection start gradation toward a higher gradation.

12. The image processing device according to claim 7, wherein the unnecessary image gradation determining unit is adapted to set, as a detection start gradation, a lowest gradation having a frequency exceeding a predetermined frequency and judge whether a first detected gradation satisfies one of conditions (I), (II), (III) and (IV) presented below when searching for a target gradation from the detection start gradation toward a higher gradation:
    (I) the target gradation is given a gradation value at which a slope of a curve in the histogram shifts from negative to positive;
    (II) the target gradation is given a gradation value at which a change rate of a slope of a curve in the histogram shifts from negative to positive;
    (III) the target gradation is given a gradation value at which a slope of a curve in the histogram is negative, and a ratio of the frequency of the gradation value to a sum of the frequencies of the gradations lower than the gradation value is or is smaller than a predetermined value;
    (IV) the target gradation is given a gradation value at which a distance from the detection start gradation value toward a higher gradation value is equal to or greater than a predetermined value.

13. The image processing device according to claim 7, wherein the unnecessary image gradation determining unit is adapted to set, as the gradation range of the unnecessary image, a gradation range extending to a lower gradation from a first detected gradation which is detected first as satisfying the specific condition when the target gradation is searched for from a lower gradation side in the histogram.

14. The image processing device according to claim 7, wherein the unnecessary image gradation determining unit is adapted to set, as the gradation range of the unnecessary image, a gradation range extending to a lower gradation from a second detected gradation which is detected at second times as satisfying the specific condition when the target gradation is searched for from a lower gradation side in the histogram.

15. The image processing device according to claim 7, wherein the unnecessary image gradation determining unit is adapted to selectively set, as the gradation range of the unnecessary image, a gradation range extending to a lower gradation side from a first detected gradation or a gradation range extending to the lower gradation side from a second detected gradation, the first and second detected gradation being detected at first and second times respectively when the target gradation is searched for from the lower gradation side in the histogram.

16. The image processing device according to claim 7, wherein the unnecessary image gradation determining unit is adapted to respond to an input operation of an operator to selectively set, as the gradation range of the unnecessary image, a gradation range extending to a lower gradation side from a first detected gradation or a gradation range extending to the lower gradation side from a second detected gradation, the first and second detected gradation being detected at first and second times respectively when the target gradation is searched for from the lower gradation side in the histogram.

17. The image processing device according to claim 1, wherein the unwanted pixel gradation converter is adapted to convert the gradation data satisfying the unwanted gradation conditions, into a lowest one of the gradations that can be output by the image processing device.

18. The image processing device according to claim 6, wherein the unwanted gradation condition provider is adapted to determine, as a threshold value for the determination of unwanted gradation, an upper limit of the gradation range determined by the unnecessary image gradation determining unit, the unwanted gradation condition being that the gradation is lower than the threshold value.

19. The image processing device according to claim 7, wherein the unnecessary image gradation determining unit is adapted to set, as the gradation range for the unnecessary image, a range extending between a first detected gradation and a second detected gradation, the first and second detected gradations being detected at first and second times respectively when the target gradation is searched for from a lower gradation side in the histogram.

20. The image processing device according to claim 19, wherein the unwanted pixel gradation converter is adapted to convert the gradation data satisfying the unwanted gradation conditions, into gradation data of an undertone in the input image data.

21. The image processing device according to claim 20, wherein the gradation data of the undertone is determined based on the first detected gradation which is detected first when the target gradation is searched for from the lower gradation side in the histogram.

22. The image processing device according to claim 18, further comprising:
an adjusted pixel determining unit for judging whether a pixel having gradation data that does not satisfy the unwanted gradation condition with respect to at least one of the color components is an adjusted pixel that satisfies a certain adjusting gradation condition which is predetermined with respect to each one of the color components, the judgment being made with respect to all the gradation data of the plurality of color components of the pixel; and
an adjusted pixel gradation converter for converting each one of the gradation data of the plurality of color components of the adjusted pixel into a gradation lower than an original gradation of the adjusted pixel in the image represented by the input image data.

23. The image processing device according to claim 22, wherein the adjusting gradation condition is set such that the gradation is lower than a predetermined adjusting gradation threshold value.

24. The image processing device according to claim 23, wherein the adjusting gradation threshold value is determined based on the unwanted gradation threshold value.

25. The image processing device according to claim 23, wherein the adjusted pixel gradation converter is adapted to convert a gradation data of each one of the color components of each one of the adjusted pixels into a data of a gradation that is computed in accordance with the gradation in the image represented by the input image data by means of a function having parameters of the unwanted gradation threshold value and the adjusting gradation threshold value with respect to each one of the color components.

26. The image processing device according to claim 23, wherein the adjusted pixel gradation converter is adapted to set a common gradation lowering rate and lower the gradations of adjusted pixels with the common gradation lowering rate which is common to all the color components, thereby adjusting the gradations of the adjusted pixels.

27. The image processing device according to claim 26, further comprising:
a target color component setter for setting, as a target color component, one of the plurality of color components of each one of the pixels of the image represented by the input image data, wherein
the adjusted pixel gradation converter is adapted to set the common gradation lowering rate with respect to each one of the adjusting pixels depending on the gradation of the target color component.

28. The image processing device according to claim 27, wherein the target color component setter is adapted to set, as the target color component, a color component having a smallest distance relative to the adjusting pixel threshold value, among the plurality of color components composing each one of the adjusted pixels.

29. The image processing device according to claim 27, wherein the adjusted pixel gradation converter is adapted to determine the common gradation lowering rate in accordance with the gradations of the target color component of each adjusted pixel in the image represented by the input image data, by means of a function having parameters of the unwanted gradation threshold value with respect to each one of the color components.

* * * * *